United States Patent [19]

Asakawa

[11] Patent Number: 4,872,803
[45] Date of Patent: Oct. 10, 1989

[54] FORCE CONTROLLING SYSTEM

[75] Inventor: Kazuo Asakawa, Kawasaki, Japan

[73] Assignee: Fujitsu Limited, Kawasaki, Japan

[21] Appl. No.: 175,616

[22] Filed: Mar. 29, 1988

Related U.S. Application Data

[63] Continuation of Ser. No. 675,867, Nov. 28, 1984, abandoned.

[30] Foreign Application Priority Data

Nov. 30, 1983 [JP] Japan ............................... 58-226301
Nov. 30, 1983 [JP] Japan ............................... 58-226302

[51] Int. Cl.⁴ ........................................... B25J 15/08
[52] U.S. Cl. ................................... 414/730; 294/86.4; 294/99.1; 294/119.1; 294/907; 901/34; 901/38
[58] Field of Search ...................... 901/38, 34, 32, 31; 414/730, 744.2; 318/687, 646; 294/99.1, 103.1, 907, 88, 86.4, 119.1; 73/517 B

[56] References Cited

U.S. PATENT DOCUMENTS

| | | | |
|---|---|---|---|
| 3,372,579 | 3/1968 | Hobel et al. | 73/517 B |
| 3,675,962 | 7/1972 | Simpson | 901/34 X |
| 3,815,761 | 6/1974 | Adam | |
| 3,948,093 | 4/1976 | Folchi et al. | 901/29 X |
| 4,132,318 | 1/1979 | Wang et al. | 414/591 |
| 4,229,136 | 10/1980 | Panissidi | 414/673 |
| 4,243,923 | 1/1981 | Whitney et al. | 318/646 X |
| 4,277,401 | 7/1981 | McKechnie | |
| 4,278,920 | 7/1981 | Ruoff, Jr. | 318/646 X |
| 4,533,167 | 8/1985 | Johnson | 901/34 X |
| 4,605,354 | 8/1986 | Daly | 294/907 X |
| 4,621,533 | 11/1986 | Gindy | 901/33 X |
| 4,653,793 | 3/1987 | Guinot et al. | 901/31 X |
| 4,667,997 | 5/1987 | Udagawa et al. | 294/99.1 X |
| 4,686,440 | 8/1987 | Hatamura et al. | 318/646 |

FOREIGN PATENT DOCUMENTS

| | | | |
|---|---|---|---|
| 0104871 | 4/1984 | European Pat. Off. | |
| 3038436 | 5/1982 | Fed. Rep. of Germany | 414/730 |
| 3332147 | 3/1985 | Fed. Rep. of Germany | 901/34 |
| 2375962 | 11/1972 | France | |
| 2341127 | 2/1977 | France | |
| 42766 | 4/1979 | Japan | 901/34 |
| 8303217 | 9/1983 | PCT Int'l Appl. | |
| 893806 | 1/1982 | U.S.S.R. | 901/38 |
| 763226 | 12/1956 | United Kingdom | 73/517 B |

OTHER PUBLICATIONS

IBM Technical Disclosure Bulletin, vol. 24, No. 2, Jul. 1981, pp. 1086–1088, N.Y., U.S.; E. E. Brennemann et al.: "Sensor Arrangement for a Manipulator Gripper".
IBM Technical Disclosure Bulletin, vol. 27, No. 1B, Jun. 1984, pp. 772, 773, N.Y. U.S.; E. Glassman et al.: "Compliant Gripper".

Primary Examiner—Robert J. Spar
Assistant Examiner—Donald W. Underwood
Attorney, Agent, or Firm—Staas & Halsey

[57] ABSTRACT

In a force controlling system, a movable member fixed to an elastic member applies a force to an object in correspondence with a force reference signal. At this time, an additional force is applied via a driver to the movable member by the positive feedback of the displacement of the elastic member to the driver, so that the reactive force due to the displacement of the elastic member is counteracted by the additional force. As a result, the movable memer applies only a force in correspondence to the force reference signal to the object.

92 Claims, 18 Drawing Sheets

FORCE CONTROLLING SYSTEM

"This is a continuation of co-pending application Ser. No. 675,867 filed on Nov. 28, 1984, now abandoned."

BACKGROUND OF THE INVENTION

The present invention relates to a system for controlling a force and particularly a very small force. Such a system is used in a gripping apparatus of a robot, a tactile apparatus, and the like.

Recently, the remarkable progress in factory automation (FA) or flexible manufacturing systems (FMS) has caused a large-scale integration of robots into the manufacturing processes. However, since conventional position control type robots operate regardless of their environment, such robots cannot be applied to semiconductor processes requiring fine structure operations, assembling processes for magnetic heads, inspection processes for soft food or soft materials, and the like. Thus, there is a demand for a system for controlling a very small force in robots, free of the above disadvantages.

For example, in the prior art, in the case of controlling a gripping force, a pressure sensor is provided in a gripping portion of a hand, thereby controlling the gripping force with an open angle of the hand. In this case, it is necessary to switch between position control and force control modes at a certain timing; however, it is difficult to control such a timing. Also, it is nearly impossible to accurately control a very small force, since the hand itself has friction. In addition, since a difference in gain between the position control mode and the force control mode is affected by the speed of motion of the hand, vibration and collision occur at a timing when the hand comes in contact with an object. Thus, it is almost impossible to control a gripping force within a small range. Further, one control circuit and one sensor are required for each of the position control mode and the force control mode, thus increasing the manufacturing cost.

SUMMARY OF THE INVENTION

It is an object of the present invention to provide a system for controlling a force, particularly, a very small force.

According to the present invention, a movable member fixed to an elastic member applies a force, in correspondence with a force information signal, to an object. At this time, an additional force is applied via a driving means to the movable member by the positive feedback of the displacement of the elastic member to the driving means, so that the reactive force due to the displacement of the elastic member is counteracted by the additional force. As a result, the movable member applies only the force, corresponding to the force information signal, to the object. Thus, if this force information signal indicates a very small force, only such a very small force is applied to the object.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
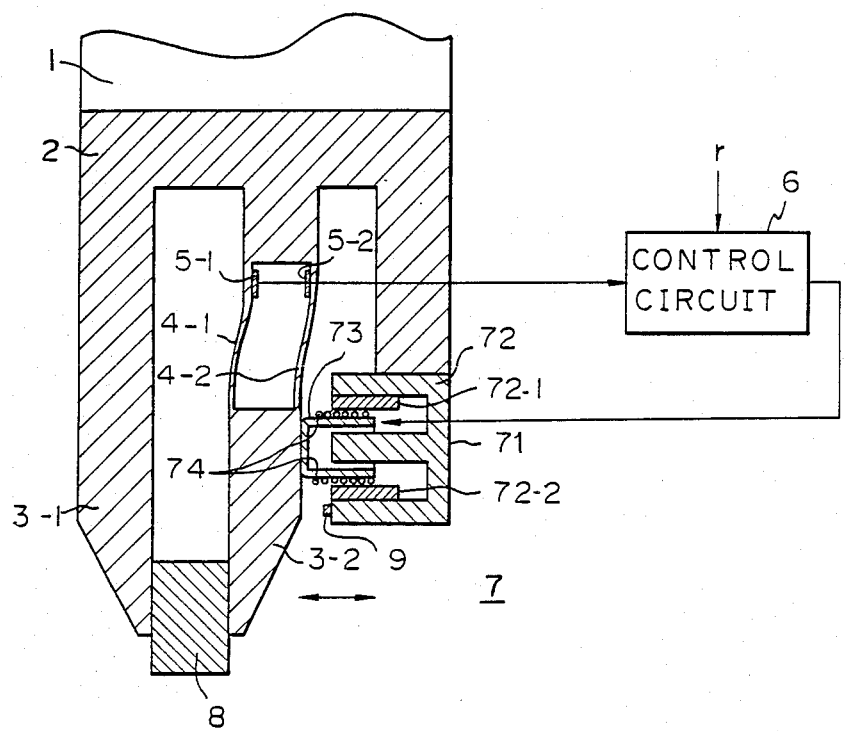
FIG. 1 is a cross-sectional view of a robot hand according to a first embodiment of the present invention.

In FIG. 1, which illustrates a first embodiment of the present invention, reference numeral 1 designates a robot arm on which a hand base 2 is mounted. The hand base 2 has two finger portions 3-1 and 3-2. In this case, the finger portions 3-1 is a rigid member, i.e., a stationary member, while the finger portion 3-2 is supported by two parallel-plate springs 4-1 and 4-2 which are linked between the portion 3-2 and the hand base 2. That is, the finger portion 3-2 serves as a movable member. Each of the parallel-plate springs 4-1 and 4-2 generates a reactive force when the finger portion 3-2 is shifted as indicated by arrows from a balance point. Fixed to the inside of the parallel-plate springs 4-1 and 4-2 are strain gauges 5-1 and 5-2, respectively, for detecting the displacement of the parallel-plate springs 4-1 and 4-2. The output signals of the strain gauges 5-1 and 5-2 are supplied to a control circuit 6 which receives a force information signaly.

The control circuit 6 controls a voice coil motor 7 which is a kind of linear motor. The voice coil motor 7 is comprised of a yoke 72 having permanent magnets 72-1 and 72-2, and a bobbin 73 on which a coil 74 is wound. The yoke 72 is fixed to the hand base 2, while the bobbin 73 is fixed to the finger portion 3-2.

Thus, the control circuit 6 controls the voice coil motor 7 to drive the finger portion 3-2, thereby gripping an object 8 with the two finger portions 3-1 and 3-2. Reference numeral 9 designates a stopper for stopping the finger portion 3-2 when the portion moves to the outside.

Note that the parallel-plate springs 4-1 and 4-2 have low shear moduli in one direction and high shear moduli in other directions, and accordingly, the parallel-plate springs 4-1 and 4-2 serve as an effectively frictionless one-way guide.

In FIG. 1, the gripping force of the finger portions 3-1 and 3-2 is controlled by the force generated by the voice coil motor 7, not by the opening angle of the finger portions 3-1 and 3-2. In addition, the output signals of the strain gauges 5-1 and 5-2 are fed back positively to the voice coil motor 7 via the control circuit 6.

Figure 2:
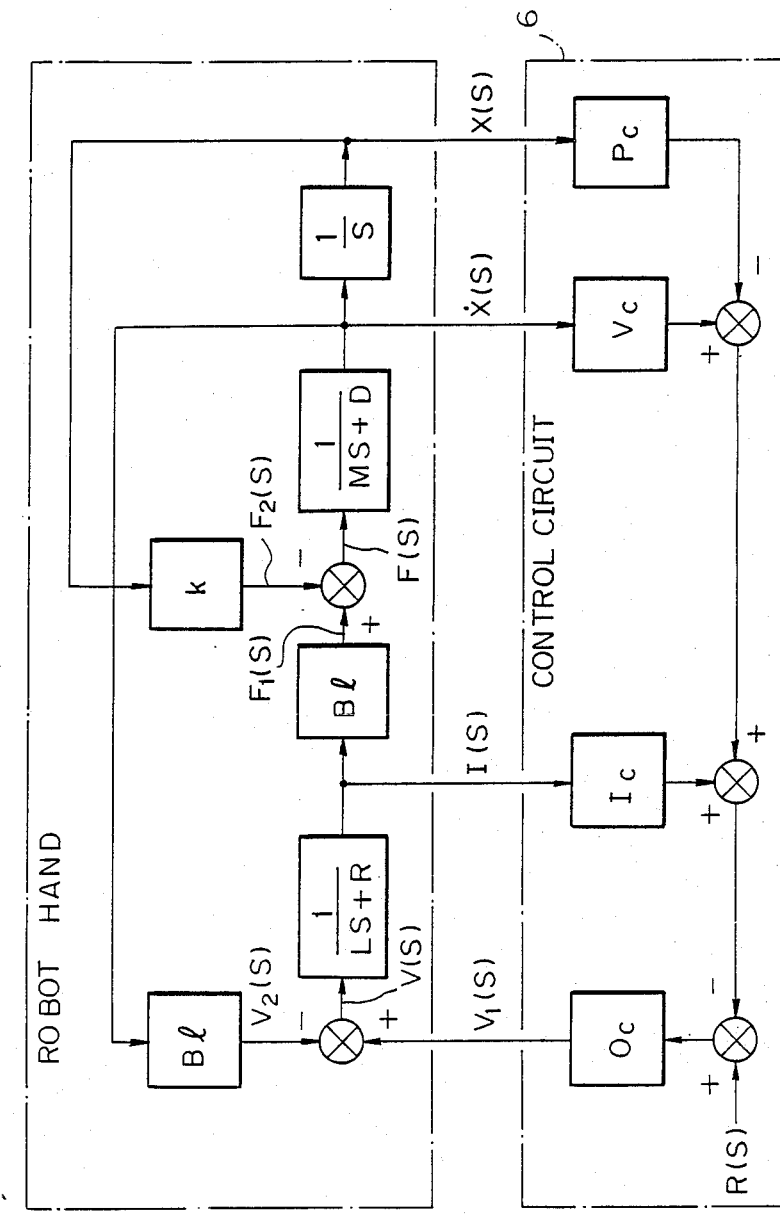
FIG. 2 is a control block diagram of the robot hand of FIG. 1.

The control block diagram of the robot hand of FIG. 1 is illustrated in FIG. 2. In FIG. 2, reference S designates a Laplace operator, $O_c$ designates an open-loop gain of the power amplifier (not shown) of the control circuit 6, B designates a space magnetic flux density of the voice coil motor 7, and l designates the length of the coil 74. Therefore, Bl is the force constant of the voice coil motor 7. The output $V_1(S)$ of the power amplifier of the control circuit 6 is applied positively to the coil 74, and in addition, the counterelectromotive force $V_2(S)$ of the voice coil motor 7 obtained by multiplying the speed $\dot{X}(S)$ by the force constant Bl is applied negatively to the coil 74. That is, $V(S)=(V_1(S)-V_2(S))$ is applied to the coil 74.

The current $I(S)$ flowing through the coil 74 is obtained by dividing $V(S)$ by the impedance $(LS+R)$ of the voice coil motor 7, where L and R are the inductance and resistance thereof, respectively. The force $F_1(S)$ generated by the voice coil motor 7 is obtained by multiplying the current $I(S)$ by the force constant Bl of the voice coil motor 7. This force $F_1(S)$ is applied positively to the movable portion, i.e., the finger portion 3-2. Also, the reactive force $F_2(S)$ of the parallel-plate springs 4-1 and 4-2, which is $kX(S)$ (k: stiffness of the springs 4-1 and 4-2, $X(S)$: displacement of the finger portion 3-2), is applied negatively to the finger portion 3-2. That is, the force $F(S)(=F_1(S)-F_2(S))$ is applied to the finger portion 3-2.

The speed $\dot{X}(S)$ is obtained by dividing $F(S)$ by the mechanical impedance $(MS+D)$ of the finger portion 3-2, where M and D are the mass and damping coefficient thereof, respectively.

Note that the force $F_1(S)$ generated by the voice coil motor 7 has a good linear characteristic regarding the current $I(S)$, since the space magnetic flux density B of the voice coil motor 7 is definite regardless of the displacement thereof. As a result, the calculated force is substantially consistent with the measurement thereof.

In the control circuit 6 of FIG. 2, the displacement $X(S)$ of the finger portion 3-2 is fed back positively thereto voice coil motor 7, while the displacement speed $\dot{X}(S)$ of the finger portion 3-2 and the current of the voice coil motor 7 are fed back negatively thereto and $P_c$, $V_c$, and $I_c$ are feedback gains of the $X(S)$, the displacement speed $\dot{X}(S)$, and the current $I(S)$, respectively.

The characteristics of the voice coil motor 7 are represented by $$e = Ri + L\frac{di}{dt} + Bl\dot{x} \tag{1}$$

$$Bli = M\ddot{x} + D\dot{x} + kx \tag{2}$$

In addition, the transfer function of the force reference signal $R(S)$ to the displacement $X(S)$ of the finger portion 3-2 is represented by $$\frac{X(S)}{R(S)} = 1/\left\{ \frac{LM}{Bl}S^3 + \frac{1}{Bl}(MI_cO_c + RM + LD)S^2 + \left(\left(\frac{I_cD}{Bl} + V_c\right)O_c + Bl + \frac{kL + RD}{Bl}\right)S + \left(\frac{kI_c}{Bl} - P_c\right)O_c + \frac{kR}{Bl}\right\} \tag{3}$$

Therefore, the damping coefficient of the entire system is represented by $$\left(\frac{I_cD}{Bl} + V_c\right)O_c + Bl + \frac{KL + RD}{Bl} \tag{4}$$

Also the stiffness of the entire system is represented by $$\left(\frac{kI_c}{Bl} - P_c\right)O_c + \frac{kR}{Bl} \tag{5}$$

Therefore, where the force reference signal $R(S)$ is changed in step, the steady-state position error of the displacement $X(S)$ is $$\lim_{s\to 0} SX(S) = \frac{1}{\left(\frac{kI_c}{Bl} - P_c\right)O_c + \frac{kR}{Bl}O_c} \tag{6}$$

Since the gain $O_c$ of the power amplifier is generally very large, for example, from 80 dB to 100 dB, and kR/Bl is nearly zero, the steady-state position error is nearly zero. This is preferable for position control type robots, but is not preferable for force control type robots because, if the width of an object is not accurate, the voice coil motor 7 serves as a spring having a stiffness as shown in formula (6) due to the error of a width indication value, thereby generating a large force. Thus, it is impossible to precisely control a force such as a gripping force.

In the present invention, the term $(KI_c/Bl-P_c)O_c$ in formula (6) is as low as possible while retaining the entire system in a stable state, thereby preventing a force due to the position error from being generated. This is possible, since the displacement $X(S)$ is fed back "positively" to the control circuit 7, that is, the sign of the gain $P_c$ is negative in the formula (6). In other words, in the present invention $$P_c \approx \frac{k}{Bl}\left(\frac{R}{O_c} + I_c\right) \approx \frac{kI_c}{Bl} \qquad (7)$$

In this state, as is apparent from the formula (3), the spring constant of the parallel-plate springs 4-1 and 4-2 is very small, for example, as determined experimentally to be 0.1 g/mm. Therefore, if the stroke of the finger portions 3-1 and 3-2 is ±2 mm, the maximum generated force due to the position error is ±0.2 g.

Note that the damping coefficient and stiffness of the entire system are determined appropriately by using the formulas (4) and (5).

Thus, if a positive gripping force component is given as R(S), the robot hand of FIG. 1 can grip the object 8 with a gripping force within an error of ±0.2 g, regardless of the width of the object 8. Conversely, if a negative gripping force is given as R(S), the finger portions 3-1 and 3-2 are opened, and accordingly, the finger portion 3-2 comes in contact with the stopper 9 with a definite force.

Also, in FIG. 1, it is possible to measure the width of the object 8 by using the output signals of the strain gauges 5-1 and 5-2.

Figure 3:
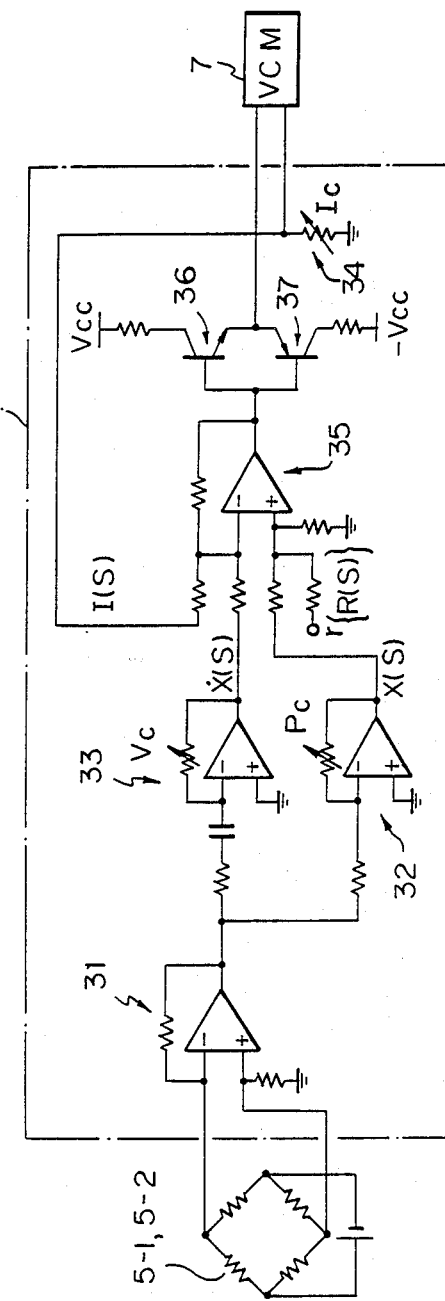
FIG. 3 is a circuit diagram of the control circuit of FIG. 1.

An example of the control circuit 6 of FIG. 1 is illustrated in FIG. 3. In FIG. 3, the output signals of the strain gauges 5-1 and 5-2 are supplied to a buffer 31. The output signal of the buffer 31 is supplied to a buffer 32 having the gain $P_c$ and a differentiator 33 having the gain $V_c$. Reference numeral 33 designates a resistor for detecting the current flowing through the voice coil motor 7. The current detecting means formed by the resistor 34 has the gain $I_c$. Reference numeral 35 is an amplifier having the open-loop gain $O_c$. The force information signal r{R(S)} and the output {X(S)} of the buffer 32 are applied positively to the amplifier 35, while the output {X(S)} of the differentiator 33 and the output {I(S)} of the resistor 34 are applied negatively to the power amplifier 35. The output of the amplifier 35 is applied to output transistors 36 and 37. That is, the power amplifier 35 drives the voice coil motor 7 via the output transistors 36 and 37, so that the sum of $R(S)+\dot{X}(S)-X(S)$ is zero.

In FIG. 2, the gains $P_c$, $V_c$, and $I_c$ are manually adjusted; however, if the control circuit 6 is incorporated into a microcomputer, these gains $P_c$, $V_c$, and $I_c$ can be adjusted by software.

In FIG. 1, since the voice coil motor 7 of a cylinder type is provided on the outside of the finger portion 3-2, the robot hand becomes relatively large. Contrary to this, in FIG. 4, which is a modification of the robot hand of FIG. 1, a voice coil motor 7' of a plate type is provided on the side of the finger portions 3-1 and 3-2, thereby reducing the size of the robot hand. The voice coil motor 7' of a plate type is comprised of two yokes 71'-1 and 71'-2, permanent magnets 72'-1 and 72'-2, a coil 73' of a plate type having terminals 73'a, a bobbin 74', and a spacer 75' of a non-magnetic material. Reference numerals 10 and 11 designate screw holes for assembling the voice coil motor 7'.

The yoke 71'-1 having the permanent magnet 72'-1 the spacer 75', and the yoke 71'-2 having the permanent magnet 72'-2 are mounted on the hand base 2 by inserting screws into screw holes 11. On the other hand, the plate type coil 73' associated with the bobbin 74' is mounted on the finger portion 3-2 by inserting screws into the screw holes 10. Thus, when a current is supplied to the plate-type coil 73' via the terminals 73'a, the current flowing through the coil 73' interacts with a magnetic circuit formed by the permanent magnets 72'-1 and 72'-2, thereby moving the finger portion 3-2.

Note that such a voice coil motor 7' can be provided on both sides of the finger portions 3-1 and 3-2.

Figure 4:
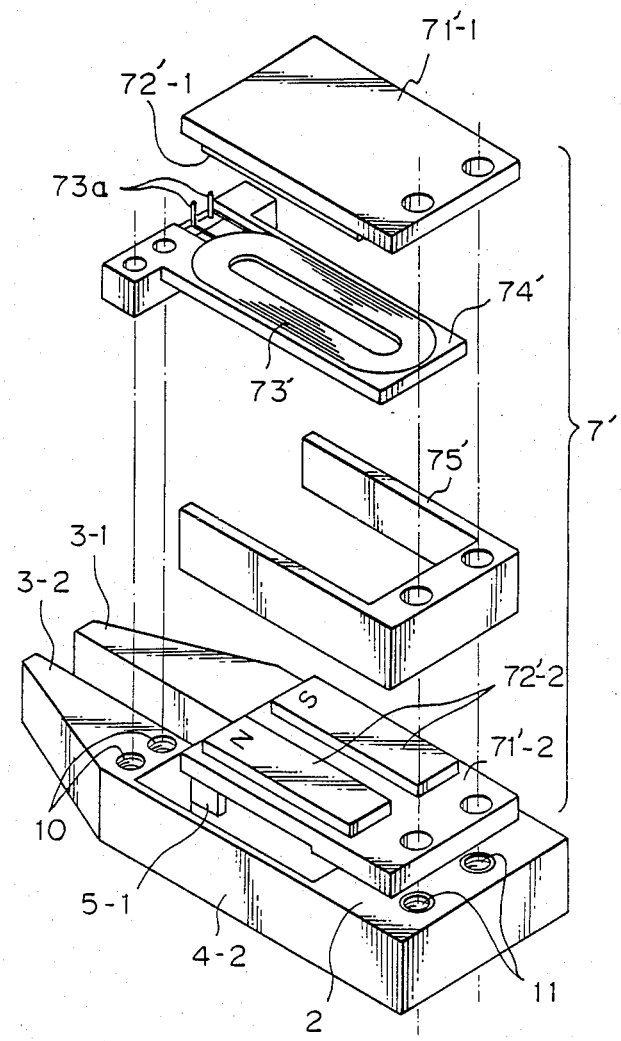
FIG. 4 is an exploded, perspective view of another robot hand according to the present invention.

The bobbin 74' of FIG. 4 is conventionally made of plastic such as a resin. However, since plastic has a low heat conductivity, a plastic bobbin may be distorted by the heat generated by the coil 73'. Therefore, it is preferable that the bobbin 7' be made of aluminum, since aluminum has a high heat conductivity, a high shear modulus, and a high electrical conductivity. When an aluminum bobbin of a high electrical conductivity moves within a magnetic field, a large eddy current is generated in the bobbin, thereby increasing the damping coefficient of the voice coil motor 7, which is helpful in stabilizing the entire control system. In this case, it is necessary to completely insulate the coil 73' from the aluminum bobbin 74'. For this purpose, the aluminum bobbin 74' is preferably made by alumite processing, thereby obtaining a high insulation regardless of the number of turns of the coil 73'. Further, it is preferably that the aluminum bobbin 74' be made by black alumite processing, thereby avoiding flaws in the coil 73'. Still further, a groove having the same configuration as the coil 73' is formed in the bobbin 74'.

Cobalt magnets having high magnetic susceptibility are used as the permanent magnets 72'-1 and 72'-2, to reduce the size thereof. However, since a strong magnetic attraction or repulsion is generated between such magnetized cobalt magnets, some problems occur when mounting the magnetized cobalt magnets on the yokes.

Figure 5:
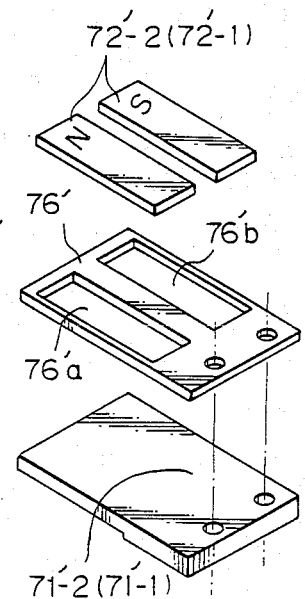
FIG. 5 is an exploded, perspective view explaining the assembling of the robot hand of FIG. 4.

In order to easily mount the magnetized cobalt magnets 72'-1 and 72'-2 on the yokes 71'-1 and 71'-2, respectively, a magnet fixing frame 76' of non-magnetic material is provided for each of the magnets 72'-1 and 72'-2, as illustrated in FIG. 5. That is, apertures 76'a and 76'b are provided in the magnet fixing frame 76', and accordingly, the mounting of the magnets 72'-2 (72'-1) is carried out by inserting the magnets into the apertures 76'a and 76'b. The thickness of the magnet fixing frame 76' is equal to or a little smaller than that of the magnets 72'-2 (72'-1).

The robot hands as illustrated in FIGS. 1 through 5 can grip an object having a small range of width depending upon the length of the parallel-plate type springs 4-1 and 4-2. For example, such a width range is about 4 mm. Therefore, exchange of the robot hands is carried out in accordance with the magnitude of width of the objects.

Figure 6:
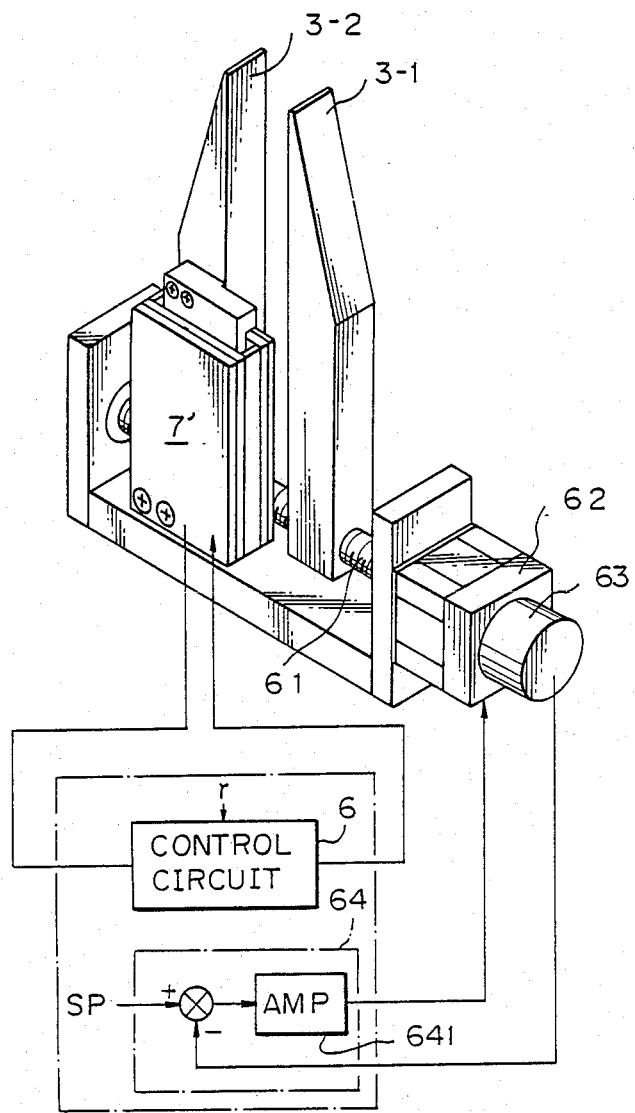
FIG. 6 is a perspective view of a robot hand according to a second embodiment of the present invention.

In FIG. 6, which illustrates a second embodiment of the present invention, the finger portions 3-1 and 3-2 are provided at a feed screw 61 which is divided into a left-handed screw portion and a right-handed screw portion. For example, the finger portion 3-1 is provided at the left-handed screw portion, while the finger portion 3-2 is provided at the right-handed screw portion. Therefore, if the feed screw 61 rotates in one direction, the finger portion 3-1 approaches the finger portion 3-2, while, if the feed screw 61 rotates in the other direction, the finger portion 3-1 separates from the finger portion 3-2. That is, the span between the finger portions 3-1 and 3-2 is controlled by the rotation of the feed screw 61 which is driven by a direct current (DC) motor 62. The DC motor 62 is connected to an angle encoder 63.

The finger portion 3-2 is also supported by the parallel-plate springs 4-1 and 4-2 (see FIGS. 1 and 4) and is driven by the voice coil motor 7' which is the same as that of FIG. 4. Therefore, the voice coil motor 7' is controlled by the control circuit 6 which is the same as that of FIG. 1.

As explained above, the span between the finger portions 3-1 and 3-2 is driven by the DC motor 62. This DC motor 62 is controlled by another control circuit 64 which is comprised of a constant current amplifier 641. That is, in the control circuit 64, a span information signal sp is applied positively to the amplifier 641, while the output of the angle encoder 63 is applied negatively to the amplifier 641. Therefore, the DC motor 62 is controlled by the negative feedback of the angle encoder 63 to the DC motor 62, so that the output of the encoder 63 coincides with the span information signal sp.

Thus, the voice coil motor 7' is used for the control of a gripping force and the DC motor 62 is used for the control of the span between the finger portions 3-1 and 3-2, thereby controlling a gripping force for an object regardless of the width thereof.

If a gripping force is controlled by only the DC motor with no voice coil motor, it is almost impossible to control a very small gripping force of the order of grams, since a blind band exists in a control system due to the friction of the movable portions such as the feed screw 61 and the DC motor 62. Of course, in the embodiment of FIG. 6, it is also impossible to contradict the span error due to the above-mentioned blind band. However, with the present invention it is possible to control a fine gripping force by driving the voice coil motor where the span error is, for example, ±2 mm.

In other words, in the robot hand of FIG. 6, if the span information signal sp having an accuracy of ±2 mm is given to the control circuit 64, it is possible to grip an object with a fine gripping force, since the voice coil motor 7' has no friction portion.

Note that the control circuits 6 and 64 can be also incorporated into a microcomputer, so that the parameters such as γ, sp and the like are controlled by software.

In FIG. 6, the output of the displacement sensor (in this case, the strain gauges) is fed back to the control circuit 6, thereby controlling the voice coil motor 7', while the output of the angle encoder 63 is fed back to the control circuit 64, thereby controlling the DC motor 62. That is, the control for a gripping force is independent of the control for a span between the finger portions.

Figure 7:
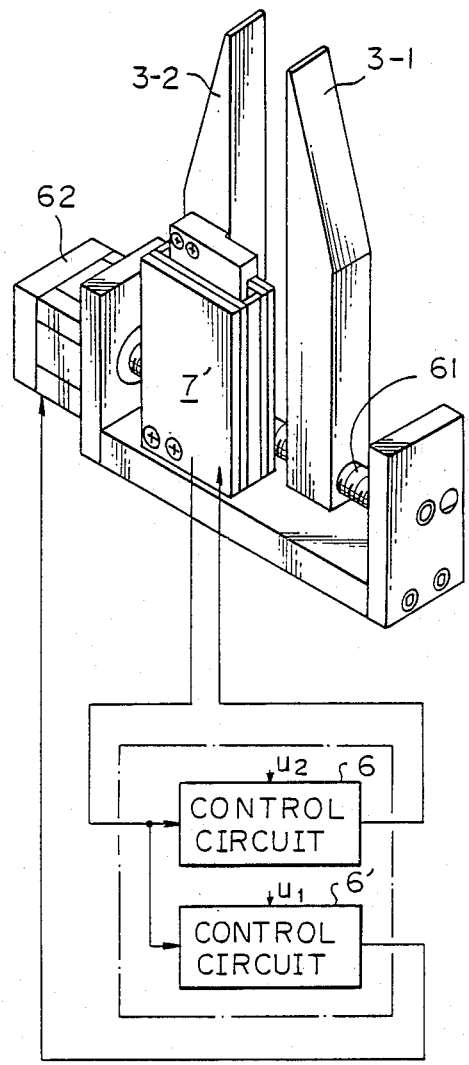
FIG. 7 is a perspective view of a robot hand according to a third embodiment of the present invention.

In FIG. 7, which illustrates a third embodiment of the present invention, there is illustrated a robot hand similar to the robot hand of FIG. 6. However, the robot hand of FIG. 7 comprises no angle encoder. In FIG. 7, the output of the strain gauges (not shown) is applied positively to the control circuit 6, thereby controlling the voice coil motor 7' which is the same as that of FIG. 4, and the output of the strain gauges is also applied negatively to a control circuit 6', thereby controlling the DC motor 62 in a position control mode. That is the output of the strain gauges is applied to both of the control circuits 6 and 6'.

Figure 8:
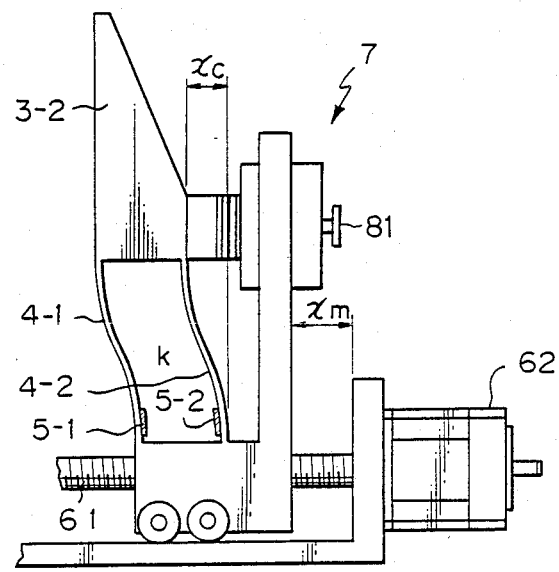
FIG. 8 is a perspective view of a modification of FIG. 7.

In FIG. 8, which is a modification of the robot hand of FIG. 7, the voice coil motor 7 of FIG. 1 is used instead of the voice coil motor 7' of FIG. 4. The robot hand of FIG. 8 has the same control means as that of FIG. 7. Note that reference numeral 81 is a stopper.

In the robot hand of FIG. 7 (or FIG. 8), the voice coil motor 7' (or 7) mounted on the finger portion 3-2 is mainly operated, while the DC motor 62 for rotating the feed screw 61 is additionally operated. That is, when it is impossible to grip an object by only the operation of the voice coil motor 7' (or 7), the DC motor 62 is rotated so as to obtain a predetermined span between the finger portions 3-1 and 3-2.

Note that it is also impossible to control a small gripping force only by controlling the DC motor 62 in the same way as in the second embodiment of FIG. 6.

Figure 9:
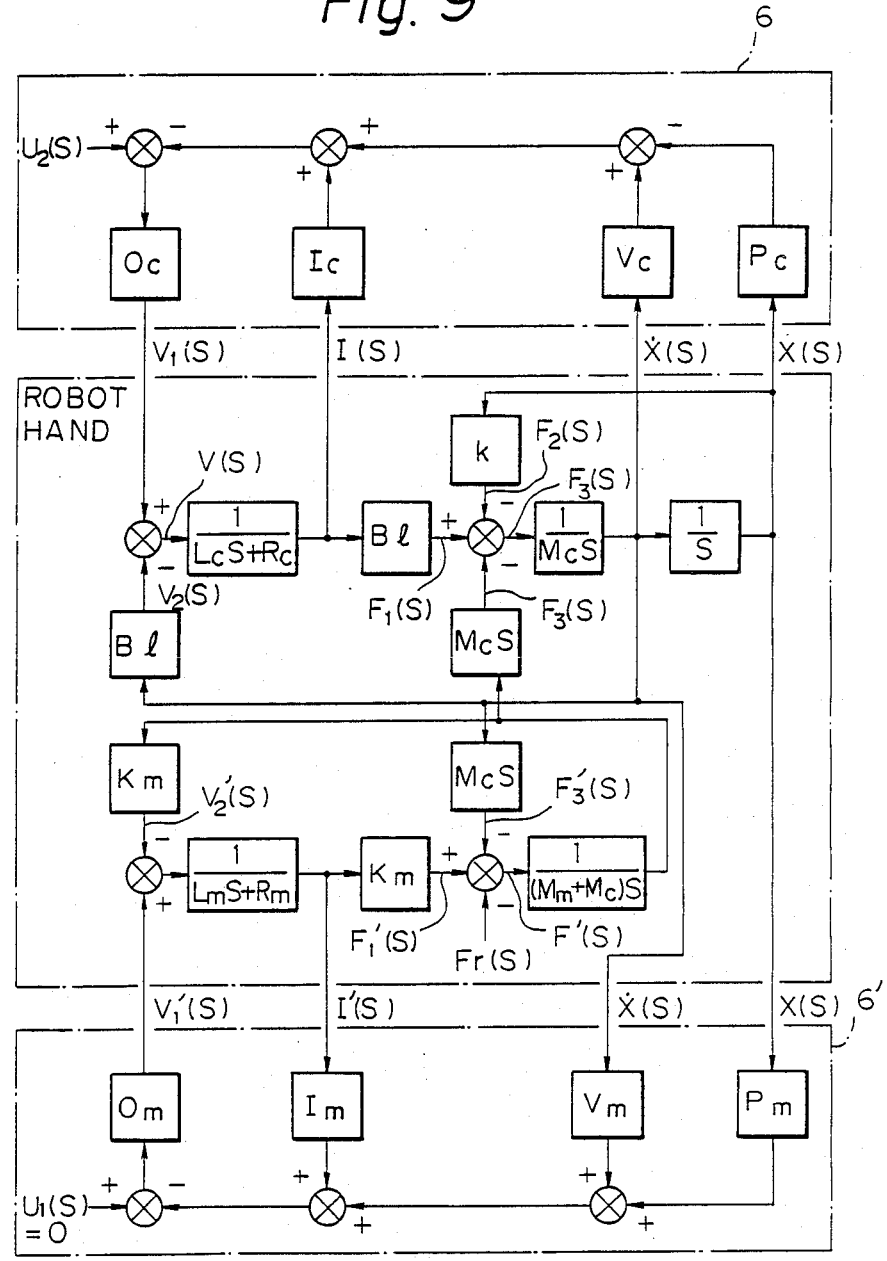
FIGS. 9 and 10 are control system block diagrams explaining the operation of the robot hand of FIGS. 7 and 8.
Figure 10:
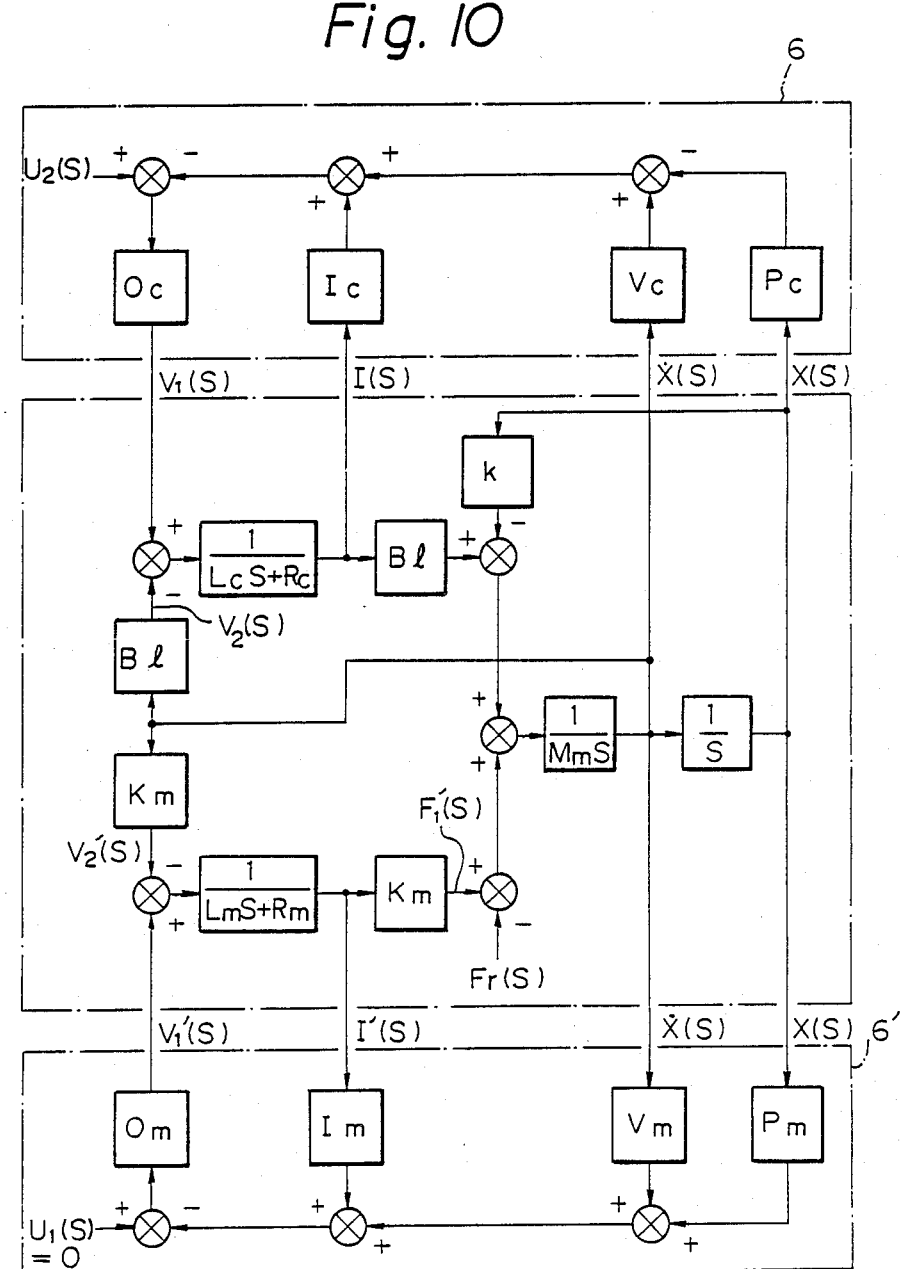

The control block diagrams of the robot hand of FIG. 7 (or FIG. 8) are illustrated in FIG. 9 and 10. The control block diagram of FIG. 9 shows the state where the finger portion 3-2 is not in contact with an object, while the control block diagram of FIG. 10 shows the state where the finger portion 3-2 is in contact with the object.

That is, as is understood from FIGS. 9 and 10, in the embodiment of FIG. 7, the output of the strain gauges 5-1 and 5-2 fixed to the parallel-plate springs 4-1 and 4-2 (see: FIG. 1) is fed back positively to the the control circuit 6 of voice coil motor 7', and simultaneously, the abovementioned output is fed back negatively to the control circuit 6' of the DC motor 62. In other words, the feed control of the feed screw 61 and the gripping force of the finger portions 3-1 and 3-2 are both controlled by detecting the displacement of the parallel-plate springs 4-1 and 4-2.

Referring to FIG. 9, the difference voltage V(S) between the output voltage $V_1(S)$ of the power amplifier of the control circuit 6 and the counterelectromotive force $V_2(S)$ is applied to the coil 73' (or 73) of the voice coil motor 7' (or 7). Therefore, the current I(S) flowing through the coil 73' (or 73) is given by $$I(S) = \frac{V(S)}{L_c S + R_c}$$

where $L_c$ and $R_c$ are the inductance and resistance of the voice coil motor 7' (or 7) and $L_c S + R_c$ is the impedance of the voice coil motor 7' (or 7). The force $F_1(S)$ generated by the voice coil motor 7' (or 7), which is BlI(S) (Bl, I(S): force constant and current of the voice coil motor 7' (or 7)), is applied positively to the finger portion 3-2, while the reactive force $F_2(S)$ of the parallel-plate springs 4-1 and 4-2, which is kX(S) (k: spring constant of the springs 4-1 and 4-2, X(S): displacement of the finger portion 3-2), is applied negatively to the finger portion 3-2. Also, applied negatively to the finger portion 3-2 is a force $F_3(S)$ given by $$F_3(S) = M_c S \cdot \dot{X}'(S)$$

where $M_c$ is the mass of the finger portion 3-2 and $\dot{X}'(S)$ is the speed of the feed screw 61. That is, the force F(S) $(=F_1(S)-F_2(S)-F_3(S))$ is applied to the finger portion 3-2. Therefore, the speed $\dot{X}(S)$ of the finger portion 3-2 is given by $$\dot{X}(S) = \frac{F(S)}{M_c S}$$

Also, the displacement X(S) of the finger portion 3-2 is given by $X(S) = \dot{X}(S)/S$.

The control circuit 6 of FIG. 9 has the same configuration as the control circuit 6 of FIG. 2, except that the force information signal is given by $U_2(S)$.

On the other hand, the difference voltage V'(S) between the output voltage V₁'(S) of the power amplifier of the control circuit 6' and the counterelectromotive force V₂'(S) is applied to the DC motor 62. Therefore, the current I'(S) flowing through the DC motor 62 is given by $$I'(S) = \frac{V'(S)}{L_m S + R_m}$$

where $L_m$ and $R_m$ are the inductance and resistance of the DC motor 62 and $L_m S + R_m$ is the impedance of the DC motor 62. The force $F_1'(S)$ generated by the DC motor 62, which is $K_m I'(S)$ ($K_m$, I'(S): induced voltage constant and current of the DC motor 62), is applied positively to the feed screw 61, while the frictional force $F_r(S)$ of the DC motor 62, the feed screw 61, and the like is applied negatively to the feed screw 61. Also, applied negatively to the feed screw 61 is a force $F_3'(S)$ given by $$F_3'(S) = M_c S \dot{X}'(S)$$

where $M_c$ is the mass of the finger portion 3-2 and $\dot{X}(S)$ is the displacement speed of the finger portion 3-2. That is, the force $F'(S)$ ($=F_1'(S) - F_r(S) - F_3'(S)$) is applied to the feed screw 61. Therefore, the speed $\dot{X}'(S)$ of the feed screw 61 is given by $$\dot{X}'(S) = \frac{F'(S)}{(M_m + M_c)S}$$

where $M_m$ is the mass obtained by subtracting the mass of the movable portion of the voice coil motor 7' (or 7) from the load mass of the DC motor 62.

Note that damping coefficients are omitted from the mechanical impedance terms of FIGS. 9 and 10.

In the control circuit 6', $P_m$, $V_m$, and $I_m$ are feedback gains of the displacement, the displacement speed, and current of the feed screw 61, respectively. In addition, $O_m$ is an open-loop gain of the power amplifier of the control circuit 6'. Here, a span information signal $U_1(S)$ ($=O$) is given to the power amplifier. An actual circuit of the control circuit 6' can be constructed in the same manner as in FIG. 3, and accordingly, the details thereof are omitted.

In the state as illustrated in FIG. 9, the dynamic equations thereof are as follows.

$$M_c \ddot{x}_c + (M_m + M_c)\ddot{x}_m = -D_m \dot{x}_m + K_m I_m - F_r \quad (8)$$

$$M_c(\ddot{x}_m + \ddot{x}_c) = -kx_c - D_c \dot{x}_c + BlI_c \quad (9)$$

$$L_m \dot{I}_m = -R_m I_m + E_m - K_m \dot{x}_m \quad (10)$$

$$L_c \dot{I}_c = -R_c I_c + E_c - Bl\dot{x}_c \quad (11)$$

Here, $X_c$ is the displacement of the finger portion 3-2;

$X_m$ is the displacement of the feed screw 61;
$E_c$ is the voltage of the voice coil motor 7' (or 7); and
$E_m$ is the voltage of the DC motor 62.

In the state as illustrated in FIG. 9, the force information signal $U_2(S)$ is given to the voice coil motor 7' (or 7), and the span information signal $U_1(S)$ ($=O$) is given to the DC motor 62. As a result, the voice coil motor 7' (or 7) moves the finger portion 3-2 to a definite position defined by the stopper 81, and accordingly, $x_c$ is generated in the displacement of the finger portion 3-2. Therefore, the DC motor 62 is operated by the control circuit 6' so as to reduce the displacement $x_c(X(S))$ of the finger portion 3-2. In this case, however, even when the DC motor 62 is operated, the displacement $x_c$ cannot be zero, unless the acceleration of the DC motor 62 is very large. Finally, the finger portion 3-2 touches an object, and as a result, the dynamic equations (8), (9), (10), and (11) are changed as follows.

$$M_m \ddot{x}_c = -kx_c + BlI_c + K_m I_m - F_r - (D_m + D_c)\dot{x}_c \quad (12)$$

$$L_m \dot{I}_m = -R_m I_m + E_m - K_m \dot{x}_c \quad (13)$$

$$L_c \dot{I}_c = -R_c I_c + E_c - Bl x_c \quad (14)$$

That is, if a timing when the finger portion 3-2 touches the object is an initial value ($t=0$), the control system is as illustrated in FIG. 10. Here, it is assumed that the open-loop gains $O_m$ and $O_c$ of the power amplifiers are $$O_m = O_c = \infty.$$

Then, the transfer function of the entire system is represented by $$\frac{K_m}{I_m} U_1(S) + \frac{K_c}{I_c} U_2(S) = \quad (15)$$

$$\left\{ M_m S^2 + \left( \frac{K_m}{I_m} V_m + \frac{K_c}{I_c} V_c \right) S + \frac{K_m}{I_m} P_m - \right.$$

$$\left. \frac{K_c}{I_c} P_c + k \right\} X(S) + F_r(S)$$

Since $U_1(S) = 0$, the input $U_2(S)$, the frictional force $F_r(S)$, and the output $X(S)$ satisfy the following equation.

$$\left( X(S) = \frac{K_c}{I_c} \cdot \frac{1}{M_m S^2 + \left( \frac{K_m}{I_m} V_m + \frac{K_c}{I_c} V_c \right)s + \frac{K_m}{I_m} P_m - \frac{K_c}{I_c} P_c + k} \cdot U_2(S) - \right. \quad (16)$$

$$\frac{1}{M_m S^2 + \left( \frac{K_m}{I_m} V_m + \frac{K_c}{I_c} V_c \right)s + \frac{K_m}{I_m} P_m - \frac{K_c}{I_c} P_c + k} \cdot F_2(S)$$

Thus, from the equation (16), it can be seen that: (i) the entire control system is observable and controllable if $$\frac{K_m}{I_m} P_m - \frac{K_e}{I_e} P_e + k > 0;$$

(ii) a steady-state position error is generated for a step input response;

(iii) a steady-state position error is generated due to the frictional force; and (iv) two actuators, i.e., the voice coil motor 7' (or 7) and the DC motor 62 are controllable as one hybrid motor.

That is, since the characteristics as stated in (i) to (iv) are the same as those of a system having only one DC motor, no improvement occurs for position control. However, the gripping force F(S) for the finger portion 3-2 is represented by $$F(S) = \frac{K_c}{I_c} U_2(S) - \frac{K_c}{I_c}\left(V_c S - P_c + \frac{I_c}{K_c} k\right) X(S) \quad (17)$$

Therefore, if the displacement feedback gain $P_c$ is set by $$P_c = \frac{I_c}{K_c} k \quad (18)$$

and the displacement speed feedback gain $V_c$ is zero, then $$F(S) = \frac{K_c}{I_c} U_2(S) \quad (19)$$

That is, the gripping force F(S) is controllable regardless of the displacement X(S), and is also controllable without a time delay and a steady-state position error. In other words, after the finger portion 3-2 touches the object, it is possible to accurately control a fine gripping force regardless of the steady-state position error of the DC motor 62.

Note that, even when the speed feedback gain $V_c$ is zero, the damping coefficient of the entire system is not zero due to the damping coefficient $D_c$, which is, however, very small, so that the system is stable.

In order to satisfy the equation (18), a linear relationship between the spring constant k of the parallel-plate springs 4-1 and 4-2 and the output of the displacement sensor is necessary. Since the parallel-plate springs 4-1 and 4-2 have a small shear modulus in one direction, and accordingly, are not subjected to torsion, the strain gauges 5-1 and 5-2 as the displacement sensor can accurately detect the spring constant k of the springs 4-1 and 4-2.

Thus, in the third embodiment, it is possible to accurately control a force including a large force and a very small force, regardless of external disturbances such as friction. Also, since an object is gripped under the condition that the displacement of the springs is nearly zero, the feed screw 61 and the female screw portion of the finger portions 3-1 and 3-2 do not rub together, thereby improving the endurance thereof.

As is apparent from the equations (16) and (18), the response speed of the robot hand of FIG. 7 (or FIG. 8) is dependent upon the position feedback gain $P_m$ of the DC motor 62. The control system is generally unstable, i.e., in an oscillating state when the gain $P_m$ is large, however, such an oscillating state can be suppressed by the frictional force $F_r(S)$. Therefore, in the third embodiment, since the gripping force of the robot hand is not affected by the position error due to the frictional force $F_r(S)$, the frictional force $F_r(S)$ can be moderately large thereby increasing the response speed. In this regard, since a screw mechanism such as the feed screw 61 is used in the robot hand of FIG. 7, the motion of the feed screw 61 generates a large frictional force, thereby increasing the response speed.

Figure 11:
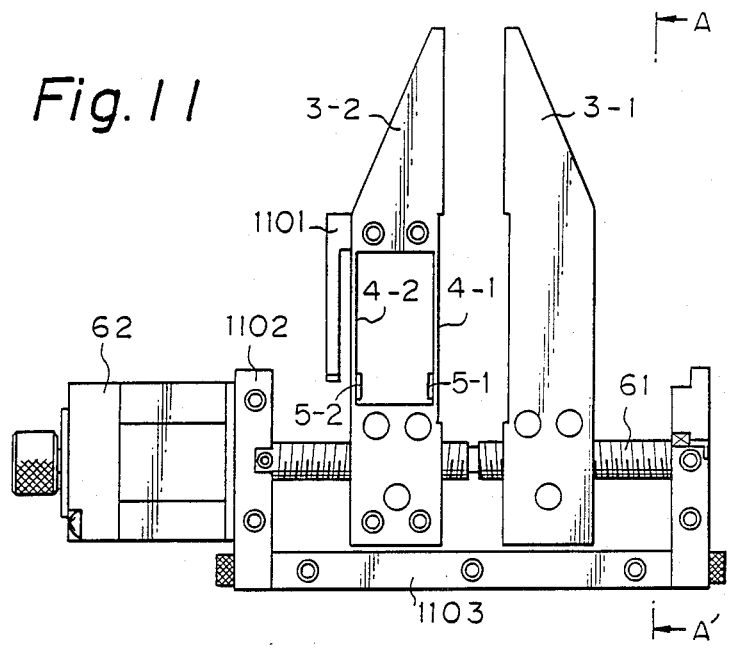
FIG. 11 is an elevational view of another modification of FIG. 7.
Figure 12:
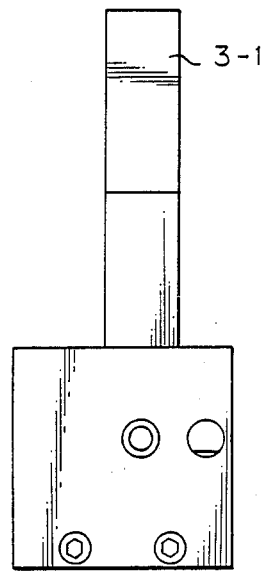
FIG. 12 is a side view of FIG. 11.
Figure 13:
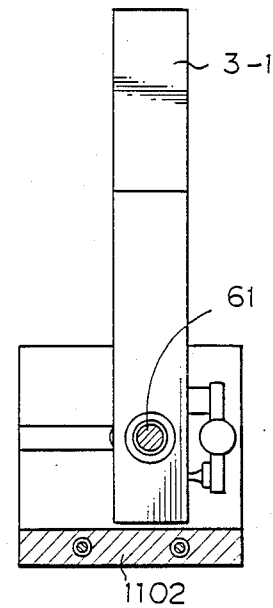
FIG. 13 is a cross-sectional view taken along the lines A-A' of FIG. 11.
Figure 14:
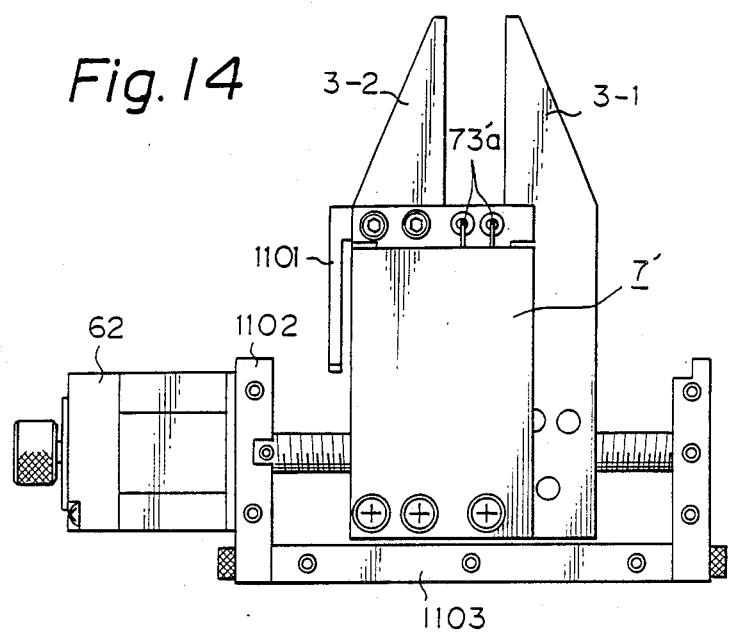
FIG. 14 is an elevational view similar to FIG. 11.
Figure 15:
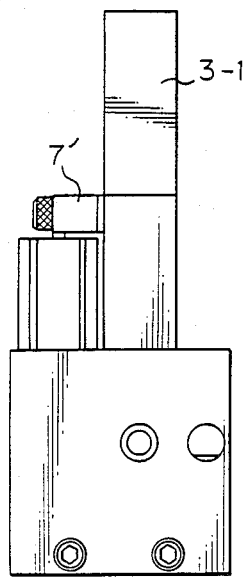
FIG. 15 is a side view of FIG. 14.

FIGS. 11 through 15 illustrate a modification of the robot hand of FIG. 7. In more detail, FIG. 12 is a side view of the robot hand of FIG. 11, and FIG. 13 is a cross-sectional view taken along the line A-A'. Also, FIGS. 14 and 15 correspond to FIGS. 11 and 12, respectively. That is, in FIGS. 11 and 12, the voice coil motor 7' is omitted, however, in FIGS., 14 and 15, the voice coil motor 7' is illustrated. As illustrated in FIGS. 11 and 14, a protrusion 1101 is provided outside of the finger portion 3-2. Therefore, when the feed screw 61 is rotated so as to move the finger portion 3-2 towards the outside, the protrusion 1101 is in contact with a side plate 1102 provided on a base 1103 of the robot hand. Thus, the opening of the robot hand is also carried out by a force control mode. That is, in FIGS. 9 and 10, when a negative force information signal is given as $U_2(S)$, the finger portion 3-2 is moved toward the outside by the voice coil motor 7' (or 7), so that the displacement of the finger portion 3-2 is detected by the parallel-plate springs 4-1 and 4-2 and is transmitted to the control circuit 6' for controlling the DC motor 62. As a result, the DC motor 62 drives the feed screw 61 to move the finger portion 3-2 towards the outside. Then, when the protrusion 1101 of the finger portion 3-2 is in contact with the side plate 1102, the displacement of the finger portion 3-2 is restored and the displacement of the springs 4-1 and 4-2 is restored, thereby stopping the DC motor 62.

Figure 16A:
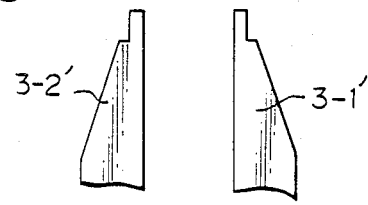
FIGS. 16A and 16B are diagrams of still another modification of the robot hand of FIG. 7.
Figure 16B:
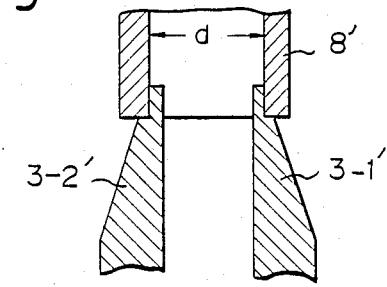

In FIG. 16A, which is a modification of the finger portions 3-1 and 3-2 of FIG. 7, finger portins 3-1' and 3-2' are shaped to grip an object such as a cylindrical object 8' as illustrated in FIG. 16B. When gripping such an object 8', a negative force information signal is given as $U_2(S)$ in FIGS. 9 and 10. Note that other modifications are possible for the shape of the finger portions 3-1 and 3-2.

Figure 17:
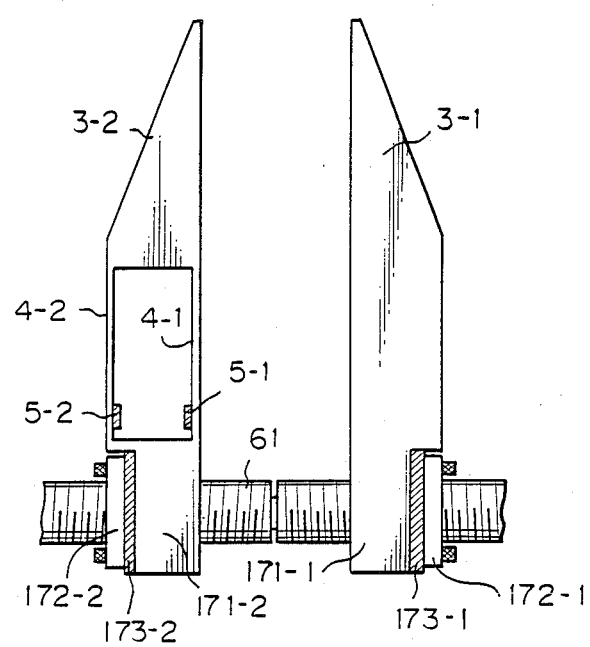
FIG. 17 is an elevational view of a still further modification of the robot hand of FIG. 7.
Figure 18:
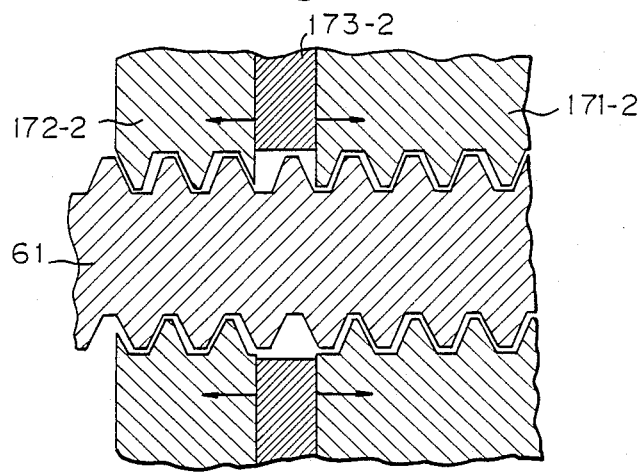
FIG. 18 is a cross-sectional view of the feed screw of FIG. 17.

In FIG. 17, which is still another modification of the robot hand of FIG. 7, the finger portions 3-1 and 3-2 are mounted on the feed screw 61 by inserting the feed screw 61 into the female screw portions 171-1 and 171-2 of the finger portions 3-1 and 3-2. In addition, the female screw portions 171-1 and 171-2 of the finger portions 3-1 and 3-2 are reinforced by nuts 172-1 and 172-2, respectively, and, in this case, elastic elements 173-1 and 173-2, which are made of, for example, rubber, are inserted therebetween. As a result, referring to FIG. 18 which is in partial cross-section the elastic element 173-2 of FIG. 17, the elastic element 173-2 generates forces as indicated by the arrows, thereby avoiding backlash between the female portions 171-1 and 171-2 of the finger portions 3-1 and 3-2 and the feed screw 61. Such a backlashless structure is helpful in adjusting a predetermined frictional force $F_r(S)$.

Figure 19:
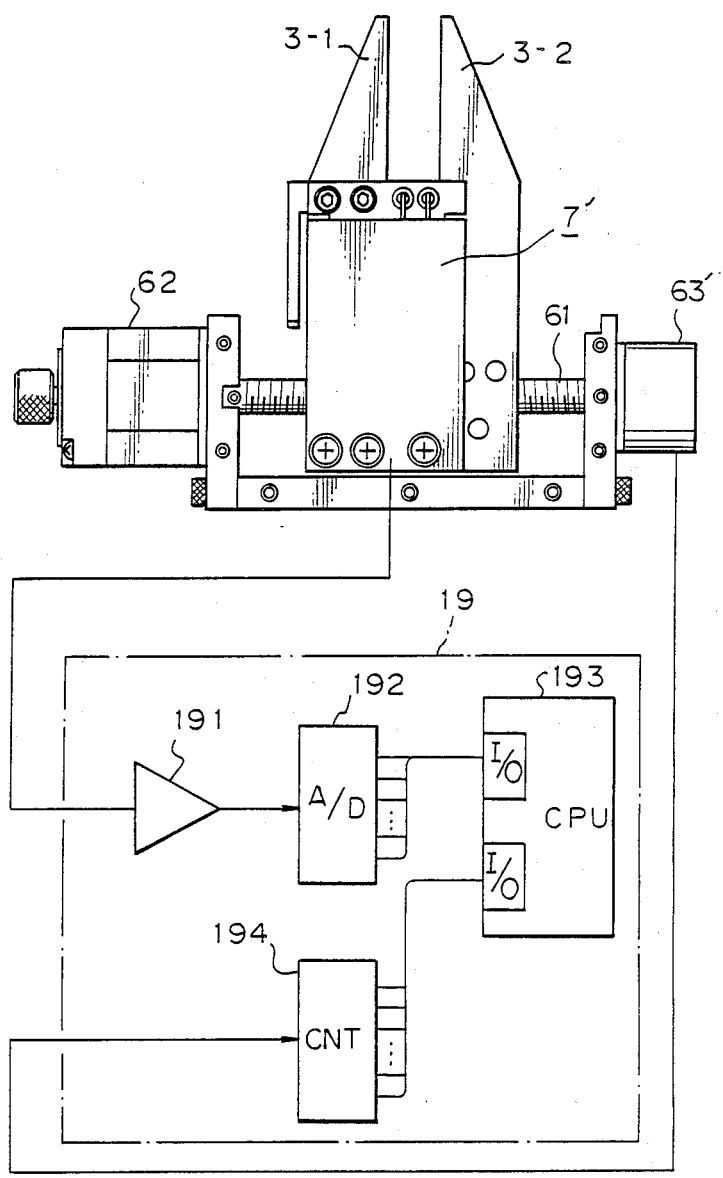
FIG. 19 is an elevational view of a robot hand according to a fourth embodiment of the present invention.

In FIG. 19, which is a fourth embodiment of the present invention, an angle encoder 63' and a control circuit 19 are added to the elements of FIG. 7, in order to measure the width of a gripped object. Note that the control circuits 6 and 6' are omitted from FIG. 19. The control circuit 19 comprises an amplifier 191 for the displacement signal of the strain gauges 5-1 and 5-2, an analog/digital (A/D) converter 192, a central processing unit (CPU) 193, and a counter 194 for counting the output signal of the angle encoder 63'.

The operation of measuring the width of an object is carried out as follows. First, a zero point is set, that is, the finger portions 3-1 and 3-2 are closed with no object therebetween. At this time, the counter 194 is cleared and the displacement signal of the strain gauges is stored as an initial displacement value $D_0$ in the memory (not shown). Then, when actually gripping an object in the same manner as explained above, the CPU 193 fetches the displacement signal value D from the strain gauges and the value C of the counter 194, and calculates the width W by $$W = C + \alpha(D - D_0)$$

where $\alpha$ is an experimentally determined constant. Thus, the width of an object such as a soft object can be easily measured.

Figure 20:
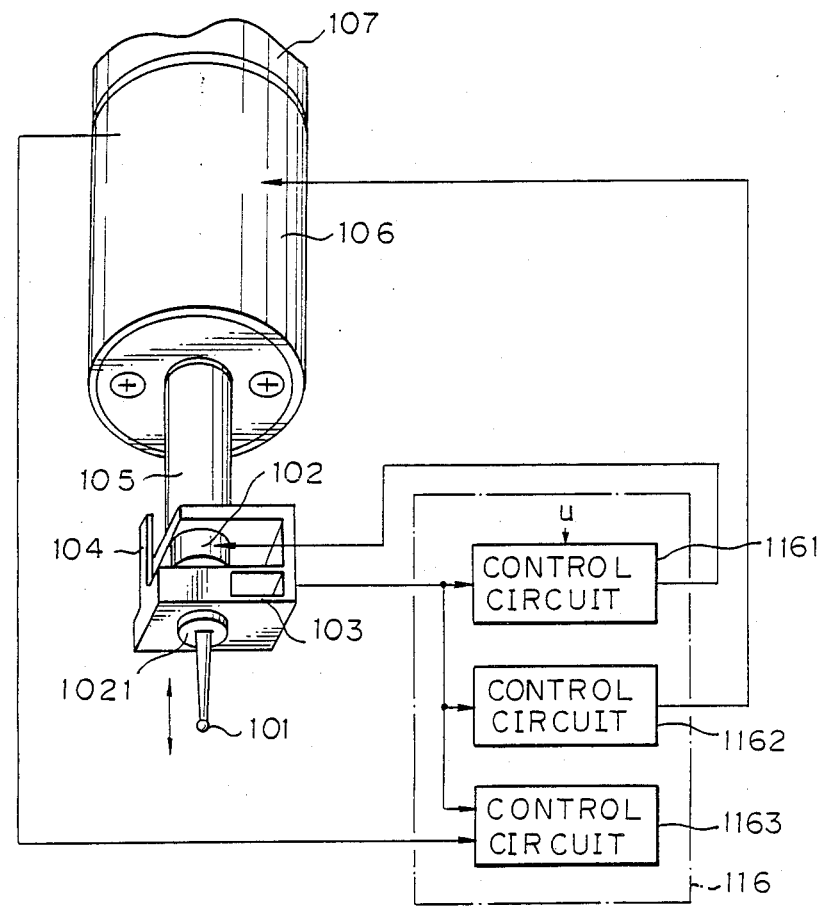
FIG. 20 is a perspective view of a tactile apparatus according to a fifth embodiment of the present invention.
Figure 21:
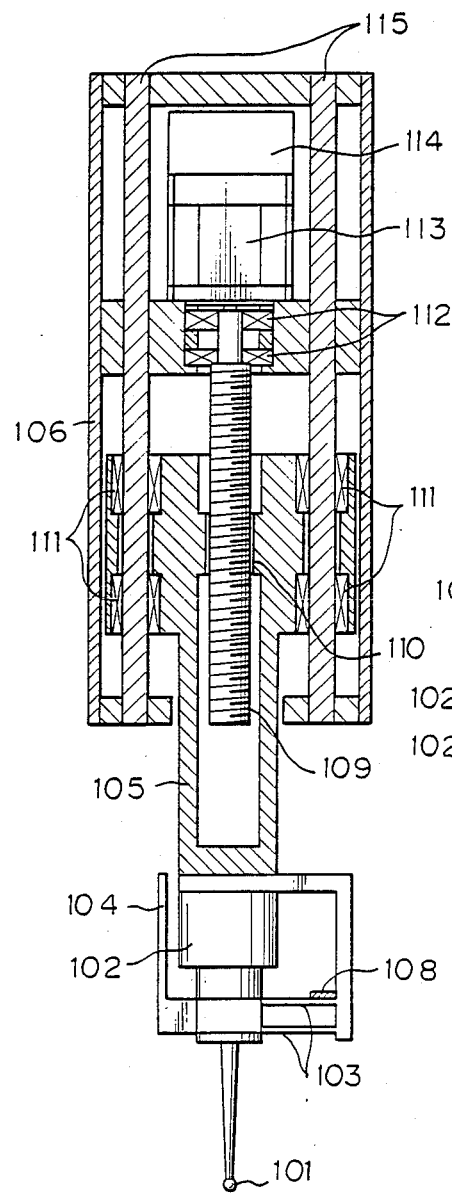
FIGS. 21 and 22 are cross-sectional views of the apparatus of FIG. 20.

In FIG. 20, which is a fifth embodiment of the present invention, a tactile apparatus is illustrated. FIG. 21 is also a cross-sectional view of the tactile apparatus of FIG. 20, and FIG. 22 is an enlarged view of the voice coil motor portion of FIG. 21.

Figure 22:
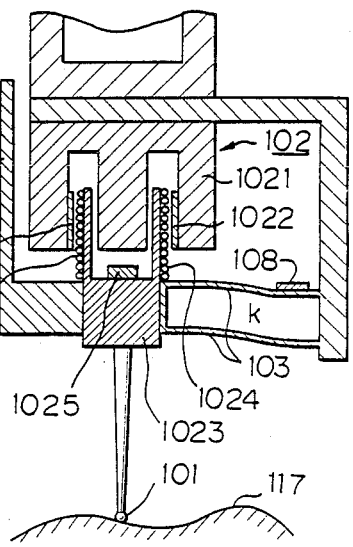

Referring to FIGS. 20, 21, and 22, reference numeral 101 designates a contact probe, 102 a voice coil motor, 103 two parallel-plate springs, 104 a stopper, 105 a movable portion of a movable mechanism, 106 a housing, 107 a robot arm, 108 a strain gauge, 109 a feed screw of the movable mechanism, 110 a nut portion of the movable mechanism, 111 and 112 bearings, 113 a DC motor, 114 an angle encoder, 115 a stopper/guide for the nut portion 110, and 116 a control circuit comprising two control circuits 116, 1162 for controlling the voice coil motor 102 and the DC motor 113, respectively, and a control circuit 1163 for measuring the dimension.

Referring to FIG. 22, the voice coil motor 102 is comprised of a yoke 1021, permanent magnets 1022 mounted on the yoke 1021, a movable portion 1023, a coil 1024 wound on the movable portion 1023, and a stopper 1025 for stopping the movable portion 1023.

The contact probe 101 is mounted on the movable portion 1023, and accordingly, the contact probe 101 can come in contact with an object 117 with a predetermined force. The movable portion 1023 of the voice coil motor 102 is supported by the parallel plate springs 103. Therefore, the parallel-plate springs 103 are displaced by the force of the voice coil motor 102 and the reactive force of the contact strobe 101. On the other hand, the yoke 1021 of the voice coil motor 102 is mounted on the movable portion 105 of the movable mechanism, and in addition, the base of the parallel-plate springs 103 is mounted on the movable mechanism.

Referring to FIGS. 21 and 22, the strain gauge 108 is fixed to the parallel-plate springs 103. Therefore, when the parallel-plate springs 103 are displaced, and a torsion is generated therein, the displacement of the springs 103 is detected by the strain gauge 108 which transmits an output to the control circuit 116. The movable portion of the movable mechanism 105 is connected to the feed screw 109 at the nut portion 110 thereof, and accordingly, the DC motor 113 drives the movable portion 105 with a large stroke. The movable portion 105 is slidably connected via the linear bearing 111 to the stopper/guide 115 fixed to the housing 106. The stopper/guide 115 stops the rotation of the nut portion 110. The rotational angle of the DC motor 113 detected by the angle encoder 114 is in proportion to the motion amount of the movable portion 105 driven by the feed screw 109.

In the same way as in the previously-mentioned embodiment, the voice coil motor 102 has no frictional mechanism, while the movable mechanism including the DC motor 113, the feed screw 109 and the like is frictional.

In FIG. 20, the control circuit 1161 receives the output signal of the strain gauge 108 to control the voice coil motor 102, while the control circuit 1162 receives the output signal of the strain gauge 108 to control the DC motor 113. That is, the control circuits 1161 and 1162 correspond to the control circuits 6 and 6' of FIG. 7, respectively. Also, the control circuit 1163 is similar to the control circuit 19 of FIG. 19.

Figure 23:
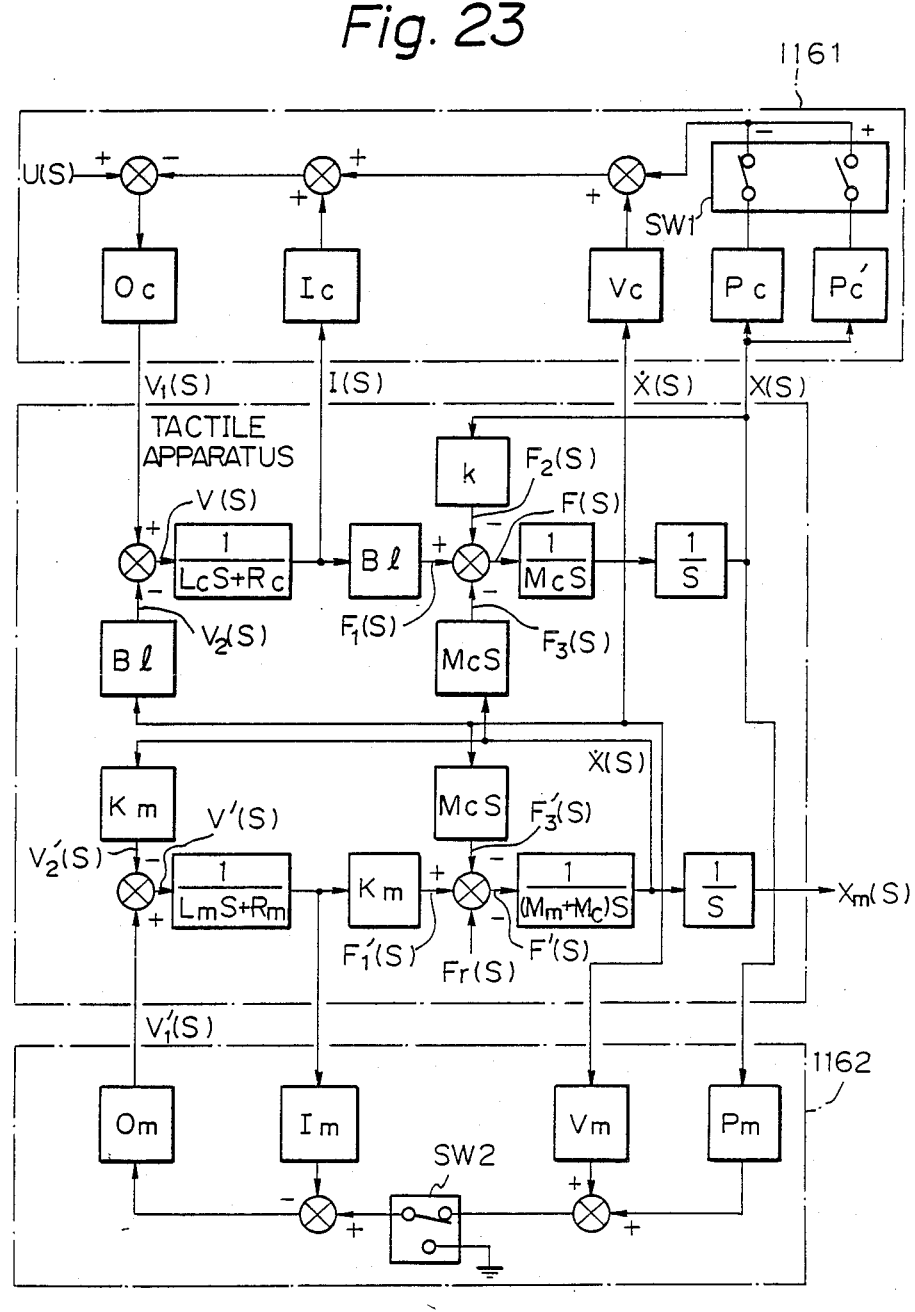
FIG. 23 is a control system block diagram explaining the operation of the apparatus of FIG. 20.

The control system of the tactile apparatus of FIGS. 20, 21, and 21 is illustrated in FIG. 23 which is the same as FIG. 9, except that analog switches SW1 and SW2 for switching operation modes are provided. The dynamic system of the tactile apparatus of FIG. 23 shows the state wherein the contact probe 101 is not in contact with the object 117. When the contact probe 101 is in contact with the object 117, the dynamic system of the tactile apparatus is replaced by the dynamic system as shown in FIG. 10.

In FIG. 23, a motion indication signal U(S) is given to only the control circuit 1161. Also, the displacement X(S) of the voice coil motor 102 is fed back positively thereto, while the displacement X(S) of the voice coil motor 102 is fed back negatively to the DC motor 113. That is, if the state of the analog switches SW1 and SW2 is as illustrated in FIG. 23, the operation of the tactile apparatus of FIG. 20 is the same as that of the robot hand of FIG. 7.

The method for measuring a three-dimensional shape will be explained (1) Setting of the Initial Contact Pressure The force due to the movable portion 1023 of the voice coil motor 102 applied to the parallel-plate spring 103 is dependent upon the attitude of the voice coil motor 102. Therefore, every time the attitude of the voice coil motor 102 is changed, it is necessary to change the initial contact pressure. That is, after the attitude of the contact probe 1 is set, the analog switches SW1 and SW2 are switched so that the displacement X(S) of the voice coil motor 102 is fed back negatively thereto, and the feedback amount of the displacement X(S) to the DC motor 113 is zero. As a result, when the parallel-plate springs 103 are held in a neutral state in which the current I(S) flowing through the coil 1024 of the voice coil motor 102 generates a force in balance with the weight of the voice coil motor 102, such a current I(S) is stored as the initial contact pressure in the memory (not shown) by the control circuit 1163. Thus, the initial pressure value is added to a pressure indication value, thereby obtaining a predetermined contact pressure.

(2) Setting of the Initial Dimension

In this case, the analog switches SW1 and SW2 are switched to a measuring mode. That is, the state of the analog switches SW1 and SW2 is the same as illustrated in FIG. 23. As a result, the displacement X(S) of the voice coil motor 102 is fed back positively thereto, and the displacement X(S) of the voice coil motor 102 is applied positively to the DC motor 113. When the control circuit 1163 detects that the housing 106 is pressing on the stopper 104 at a definite pressure, the control circuit 1163 clears the counter (see FIG. 19) and stores the displacement of the voice coil motor 102 as the initial dimension in the memory.

(3) Measurement

After completion of the steps (1) and (2), it is possible to measure an object unless the attitude of the voice coil motor 102 is changed. That is, the measured dimension is determined by the sum or difference of the motion amount of the feed screw 109 and the displacement of the parallel-plate springs 103.

According to the tactile apparatus as shown in FIGS. 20, 21, and 22, it is possible to support the contact probe 1 with a very small force of the order of grams. Also, since the set position of the contact probe is not strictly fixed, it is easy to carry out an initial set, thereby enabling automation of the dimension measurements. Further, even if an object is relatively soft, it is possible to measure the dimension of the object without damaging it.

The above-mentioned force generating apparatus, the gripping apparatus, or the tactile apparatus can be individually used and be incorporated into a robot system. Note that the force generating apparatus corresponds to the gripping apparatus having only one finger portion, such as 3-2.

Figure 24:
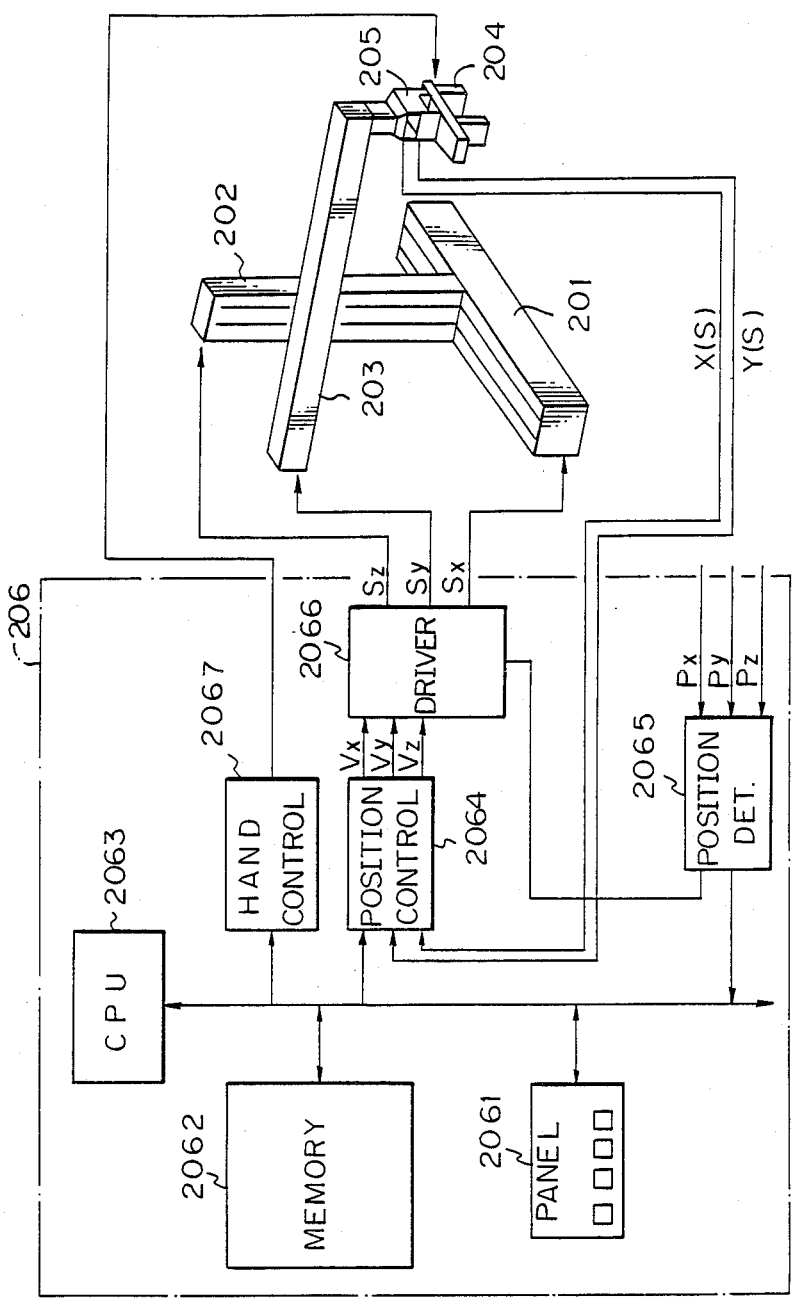
FIG. 24 is a perspective view of a robot system according to a sixth embodiment of the present invention.

A robot system incorporating a force generating apparatus is illustrated in FIG. 24. In FIG. 24, reference numeral 201 designates a robot base having an X-axis driving motor, 202 an arm having a Z-axis driving motor, 203 an arm having a Y-axis driving motor, 204 a hand, 205 a two-dimensional force generating apparatus having two kinds of voice coil motors, and 206 a control circuit. The control circuit 206 is comprised of an operation panel 2061, a memory 2062, a CPU 2063, a hand position control circuit 2064, a hand position circuit 2065, a driver circuit 2066, and a hand control circuit 2067. During a position control mode, the position control circuit 2064 receives position indication signals from the CPU 2063, thereby controlling the driver circuit 2066 for driving the robot base 201 and the arms 202 and 203. However, during a force control mode, the position indication signals from the CPU 2063 regarding the X- and Y-axis are zero, so that the position control circuit 2064 controls the driver circuit 2066 by receiving the displacement X(S) and Y(S) of the voice coil motors included in the force generating apparatus 205. In this case, the displacement X(S) regarding the X-axis is fed back positively to the voice coil motor regarding to the X-axis, however, the displacement X(S) is fed back negatively to the X-axis driving motor. Similarly, the dieplacement Y(S) regarding the Y-axis is fed back positively to the voice coil motor regarding to the Y-axis, however, the displacement Y(S) is fed back negatively to the Y-axis driving motor.

Figure 25:
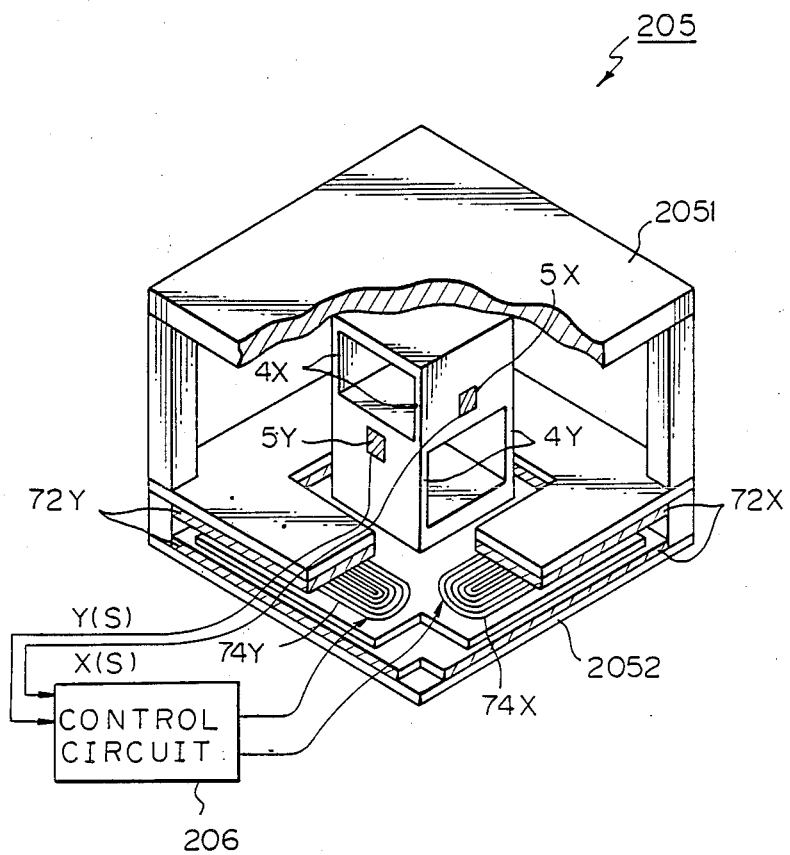
FIG. 25 is a partial perspective view of the two-dimensional force generating apparatus of FIG. 24.

Referring to FIG. 25, which is a detailed diagram of the two-dimensional force generating apparatus of FIG. 24, reference numerals 2051 and 2052 designate bases fixed to the arm 203 and the hand 206, respectively, 4X and 4Y plate-type springs in the X- and Y-directions, respectively, 5X and 5Y strain gauges in the X- and Y-directions, respectively, 72X and 72Y permanent magnets, and 74X and &4Y coils in the X- and Y-directions, respectively. In this case, the permanent magnets 72X and the coil 74X form an X-direction voice coil motor, and the permanent magnets 72Y and the coil 74Y form a Y-direction voice coil motor.

In the embodiment of FIG. 24, a two-dimensional force generating apparatus is used, however, it is possible to use a three-dimensional force generating appratus having three kinds of voice coil motors.

Further, when the tactile apparatus according to the present invention is incorporated into a robot system, the absolute coordinates of an object can be recognized easily by adding the coordinates of the robot arm to the value from the angle encoder of the DC motor of the tactile apparatus.

I claim:

1. A force generating apparatus for applying a force to an object by receiving a force information signal, comprising:
   a base member;
   an elastic member fixed to said base member and producing a reactive force when it is displaced;
   a movable member, fixed to said elastic member, for applying said force corresponding to said force information signal to said object;
   detecting means, provided on said elastic member, for detecting the displacement thereof, so that said detecting means generates a displacement signal corresponding to the displacement;
   driving means for driving said movable member, comprising a linear motor having a stator side fixed to said base member and a movable side fixed to said movable member; and
   control means, connected to said detecting means and to said driving means for controlling said driving means by said force information signal to move said movable member along a displacement direction, thereby applying a force to said object, and for controlling said driving means by said displacement signal to move said movable member along said displacement direction, thereby counteracting said reactive force of said elastic member, wherein said reactive force is counteracted and said movable member applies only a force corresponding to said force information signal to said object.

2. An apparatus as set forth in claim 1, wherein said elastic member comprises leaf spring means.

3. An apparatus as set forth in claim 1, wherein said elastic member comprises parallel-plate springs.

4. An apparatus as set forth in claim 1, wherein said detecting means comprises strain gauge means.

5. An apparatus as set forth in claim 1, wherein said driving means comprises a moving coil motor.

6. An apparatus as set forth in claim 5, wherein said moving coil motor comprises:
   a plate-type coil; and
   at least one plate-type permanent magnet located in the vicinity of said plate-type coil.

7. An apparatus as set forth in claim 6, wherein said permanent magnets are cobalt magnets.

8. An apparatus as set forth in claim 6, wherein said moving coil motor further comprises a bobbin of aluminum.

9. An apparatus as set forth in claim 8, wherein said bobbin of aluminum is made by alumite processing.

10. An apparatus as set forth in claim 6, wherein said moving coil motor further comprises at least one non-magnetic plate having a respective aperture for inserting each said plate-type permanent magnet.

11. An object processing system having a movable mechanism and receiving a predetermined force information signal, comprising:
   a force generating apparatus mounted on said movable mechanism, said force generating apparatus comprising:
   a base member;

an elastic member attached to said base member and producing a reactive force when it is displaced;

a movable member, attached to said elastic member, applying a force corresponding to said force information signal to an object;

first detecting means, provided on said elastic member, for detecting the displacement of said elastic member, so that said detecting means generates a displacement signal corresponding to the displacement; and first driving means for driving said movable member, comprising a linear motor having a stator side fixed to said base member and a movable side fixed to said movable member;

first control means, connected to said first detecting means and to said first driving means, for controlling said first driving means by said force information signal to move said movable member along a displacement direction, thereby applying a force to said object, and for controlling said driving means by said displacement signal to move said movable member along said displacement direction, counteracting said reactive force of said elastic member and applying through said movable member substantially only the force corresponding to said force information signal to said object;

means for applying said force information signal to said first control means;

second driving means for driving said movable mechanism; and second control means, connected to said second driving means, for controlling said second driving means.

12. A system as set forth in claim 11, comprising:

second detecting means, connected to said second driving means, for detecting the displacement of said movable mechanism;

wherein said second control means receives an externally supplied position indication signal and a position detecting signal from said second detecting means, and controls said second driving means so that said position detecting signal coincides with said position indication signal.

13. A system as set forth in claim 11, wherein said second control means is connected to said first detecting means, and controls said second driving means by negative feedback of the displacement of said elastic member.

14. A system as set forth in claim 11, wherein said elastic member comprises leaf spring means.

15. A system as set forth in claim 11, wherein said elastic member comprises parallel-plate springs.

16. A system as set forth in claim 11, wherein said first detecting means comprises strain gauge means.

17. A system as set forth in claim 11, wherein said first driving means comprises a moving coil motor.

18. A system as set forth in claim 11, wherein said moving coil motor comprises;

a plate-type coil; and at least one plate-type permanent magnet located in the vicinity of said plate-type coil.

19. A system as set forth in claim 18, wherein said permanent magnets are cobalt magnets.

20. A system as set forth in claim 18, wherein said moving coil motor further comprises a bobbin of aluminum.

21. A system as set forth in claim 20, wherein said bobbin of aluminum is made by alumite processing.

22. A system as set forth in claim 18, wherein said moving coil motor comprises at least one non-magnetic plate having a respective aperture for inserting each said plate-type perment magnet.

23. A system as set forth in claim 11, wherein said movable mechanism comprises a feed screw on which said force generating apparatus is mounted.

24. A system as set forth in claim 23, wherein said movable mechanism comprises at least one nut, mounted on said feed screw, for adjusting said force generating apparatus.

25. A system as set forth in claim 24, wherein said movable mechanism comprises a further elastic member inserted between said force generating apparatus and said nut.

26. A system as set forth in claim 11, wherein said second driving means comprises a DC motor.

27. A robot system including means for providing a force information signal, comprising:

an arm;

a force generating apparatus mounted on the end of said arm, said force generating apparatus comprising:

a base member;

an elastic member attached to said base member;

a movable member, attached to said elastic member, applying a force corresponding to said force information signal to an object;

first detecting means provided in said elastic member, for detecting the displacement of said elastic member, so that said first detecting means generates a displacement signal corresponding to the displacement; and first driving means for driving said movable member, comprising a linear motor having a stator side fixed to said base member and a movable side fixed to said movable member;

first control means, connected to said detecting means and to said first driving means, for controlling said first driving means by said force information signal, to move said movable member along a displacement direction thereby applying a force to said object, and for controlling said driving means by said displacement signal to move said movable member along said displacement direction, counteracting said reactive force counteracted and applying through said movable member substantially only a force corresponding to said force information signal to said object;

second driving means for driving said arm; and second control means, connected to said second driving means, for controlling said second driving means.

28. A system as set forth in claim 27, comprising:

second detecting means, connected to said second driving means, for detecting the displacement of said arm;

wherein said second control means receives a position indication signal and a position detecting signal from said second detecting means, and controls said second driving means so that said position detecting signal coincides with said position indication signal.

29. A system as set forth in claim 27, wherein said second control means is connected to said first detecting means, and controls said second driving means by negative feedback of said displacement of said elastic member.

30. A system as set forth in claim 27, wherein said elastic member comprises leaf spring means.

31. A system as set forth in claim 27, wherein said elastic member comprises parallel-plate springs.

32. A system as set forth in claim 27, wherein said first detecting means comprises strain gauge means.

33. A system as set forth in claim 27, wherein said first driving means comprises a moving coil motor.

34. An apparatus as set forth in claim 33, wherein said moving coil motor comprises:
   a plate-type coil; and
   at least one plate-type permanent magnet located in the vicinity of said plate-type coil.

35. A system as set forth in claim 34, wherein said permanent magnets are cobalt magnets.

36. A system as set forth in claim 34, wherein said moving coil motor further comprises a bobbin of aluminum.

37. A system as set forth in claim 36, wherein said bobbin of aluminum is made by alumite processing.

38. An apparatus as set forth in claim 27, wherein said moving coil motor further comprises a non-magnetic plate having a respective aperture for inserting each said plate-type permanent magnet.

39. A system as set forth in claim 27, wherein said arm comprises a feed screw on which said force generating apparatus is mounted.

40. A system as set forth in claim 39, wherein said arm further comprises a nut, mounted on said feed screw, for adjusting said force generating apparatus.

41. A system as set forth in claim 40, wherein said arm comprises a further elastic member inserted between said force generating apparatus and said nut.

42. A system as set forth in claim 27, wherein said second driving means comprises a DC motor.

43. A system as set forth in claim 27, wherein said force generating apparatus generates forces in two dimensions.

44. A system as set forth in claim 27, wherein said force generating apparatus generates forces in three dimensions.

45. A gripping apparatus for gripping an object, said gripping apparatus comprising:
   two fingers for applying force to said object by gripping said object between said two fingers, at least one of said two fingers including a base member, elastic member, movable member, detecting means and driving means, said elastic member being attached to said base member and producing a reactive force when it is displaced, said movable member being attached to said elastic member and applying a force corresponding to said force information signal to said object, and said detecting means being provided in said elastic member, and for detecting the displacement of said elastic member, so that said detecting means generates a displacement signal corresponding to the displacement; and
   said driving means for driving said movable member, comprising a linear motor having a stator side fixed to said base member and a movable side fixed to said movable member; and
   control means, connected to said detecting means and to said driving means, for controlling said driving means by said force information signal to move said movable member along a displacement direction thereby applying a force to said object, and for controlling said driving means by said displacement signal to move said movable member along said displacement direction, counteracting said reactive force and applying through said movable member substantially only the force corresponding to said force information signal to said object.

46. An apparatus as set forth in claim 45, wherein said elastic member comprises leaf spring means.

47. An apparatus as set forth in claim 45, wherein said elastic member comprises parallel-plate springs.

48. An apparatus as set forth in claim 45, wherein said detecting means comprises strain gauge means.

49. An apparatus as set forth in claim 45, wherein said driving means comprises a moving coil motor.

50. An apparatus as set forth in claim 49, wherein said moving coil motor comprises:
   a plate-type coil; and
   at least one plate-type permanent magnet located in the vicinity of said plate-type coil.

51. An apparatus as set forth in claim 50, wherein said permanent magnets are cobalt magnets.

52. An apparatus as set forth in claim 50, wherein said moving coil motor further comprises a bobbin of aluminum.

53. An apparatus as set forth in claim 52, wherein said bobbin of aluminum is made by alumite processing.

54. An apparatus as set forth in claim 50, wherein said moving coil motor further comprises a non-magnetic plate having a respective for inserting each said plate-type permanent magnet.

55. An object processing system, comprising:
   means for providing a force information signal;
   a movable mechanism having a gripping apparatus, including two fingers, mounted thereon, at least one of the two fingers including:
   a base member;
   an elastic member attached to said base member and producing a reactive force when it is displaced;
   a movable member, attached to said elastic member, applying a force corresponding to said force information signal to an object;
   first detecting means, provided in said elastic member, for detecting the displacement of said elastic member so that said first detecting means generates a displacement signal corresponding to the displacement; and
   first driving means for driving said movable member, comprising a linear motor having a stator side fixed to said base member and a movable side fixed to said movable member;
   first control means, connected to said first detecting means and to said first driving means, for controlling said first driving means by said force information signal to move said movable member along a displacement direction, thereby applying a force to said object, and for controlling said driving means by said displacement signal to move said movable member along said displacement direction, counteracting said reactive force and applying through said movable member substantially only force corresponding to said force information signal to said object;
   second driving means for driving said movable mechanism; and
   second control means, connected to said second driving means, for controlling said second driving means.

56. A system as set forth in claim 55, further comprising second detecting means, connected to said second driving means, for detecting the displacement of said movable mechanism, said second control means receiving an externally supplied position indication signal and a position detecting signal from said second detecting means, and controlling said second driving means so that said position detecting signal coincides with said position indication signal.

57. A system as set forth in claim 55, wherein said second control means is connected to said first detecting means, and controls said second driving means by negative feedback of the displacement of said elastic member.

58. A system as set forth in claim 55, wherein said elastic member comprises leaf spring means.

59. A system as set forth in claim 55, wherein said elastic member comprises parallel-plate springs.

60. A system as set forth in claim 55, wherein said first detecting means comprises strain gauge means.

61. A system as set forth in claim 55, wherein said first driving means comprises a moving coil motor.

62. A system as set forth in claim 61, wherein said moving coil motor comprises:
   a plate-type coil; and
   at least one plate-type permanent magnet located in the vicinity of said plate-type coil.

63. A system as set forth in claim 62, wherein said permanent magnets are cobalt magnets.

64. A system as set forth in claim 62, wherein said moving coil motor further comprises a bobbin of aluminum.

65. A system as set forth in claim 64, wherein said bobbin of aluminum is made by alumite processing.

66. A system as set forth in claim 62, wherein said moving coil motor further comprises non-magnetic plates having apertures for inserting said plate-type permanent magnets.

67. A system as set forth in claim 55, wherein said movable mechanism comprises a feed screw on which said base member is mounted.

68. A system as set forth in claim 67, wherein said movable mechanism further comprises a nut, mounted on said feed screw, for adjusting said base member.

69. A system as set forth in claim 68, wherein said movable mechanism comprises a further elastic member inserted between said base member and said nut.

70. A system as set forth in claim 55, wherein said movable mechanism comprises a feed screw having a left-hand screw portion and a right-handed screw portion, on one of which portions said base member is mounted, the other portion being mounted on the other finger.

71. A system as set forth in claim 70, wherein said movable mechanism further comprises two nuts, mounted on said feed screw, for adjusting said base member and the other finger.

72. A system as set forth in claim 71, wherein said movable mechanism comprises tow further elastic members inserted respectively between said base member and the other finger, and the respective one of said nuts.

73. A system as set forth in claim 55, wherein said second driving means comprises a DC motor.

74. A robot system comprising: means for providing a force information signal; an arm having a gripping apparatus including two fingers, mounted thereon, at least one of the two fingers including:
   a base member;
   an elastic member attached to said base member and producing a reactive force when it is displaced;
   a movable member, attached to said elastic member, applying a force corresponding to an externally supplied force information signal to an object;
   first detecting means, provided in said elastic member, for detecting the displacement of said elastic member, so that said first detecting means generates a displacement signal corresponding to the displacement; and
   first driving means for driving said movable member, comprising a linear motor having a stator side fixed to said base member and a movable side fixed to said movable member;
   first control means, connected to said first detecting means and to said first driving means, for controlling said first driving means by said force information signal to move said movable member along a displacement direction, thereby applying a force to said object, and for controlling said driving means by said displacement signal to move said movable member along said displacement direction, counteracting said reactive force and applying through said movable member substantially only said force corresponding to said force information signal to said object;
   second driving means for driving said movable mechanism; and
   second control means, connected to said second driving means, for controlling said second driving means.

75. A system as set forth in claim 74, further comprising:
   second detecting means, connected to said second driving means, for detecting the displacement of said arm,
   wherein said second control means receives a position indication signal and a position detecting signal from said second detecting means, and controls said second driving means so that said position detecting signal coincides with said position indication signal.

76. A system as set forth in claim 74, wherein said second control means is connected to said first detecting means, and controls said second driving means by negative feedback of said displacement of said elastic member.

77. A system as set forth in claim 74, wherein said elastic member comprises leaf spring means.

78. A system as set forth in claim 74, wherein said elastic member comprises parallel-plate springs.

79. A system as set forth in claim 74, wherein said first detecting means comprises strain gauge means.

80. A system as set forth in claim 74, wherein said first driving means comprises a moving coil motor.

81. A system as set forth in claim 80, wherein said moving coil motor comprises:
   a plate-type coil; and
   at least one plate-type permanent magnet located in the vicinity of said plate-type coil.

82. A system as set forth in claim 81, wherein said permanent magnets are cobalt magnets.

83. A system as set forth in claim 81, wherein said moving coil motor further comprises a bobbin of aluminum.

84. A system as set forth in claim 83, wherein said bobbin of aluminum is made by alumite processing.

85. A system as set forth in claim 83, wherein said moving coil motor further comprises non-magnetic plates having apertures for inserting said plate-type permanent magnets.

86. A system as set forth in claim 74, wherein said arm comprises a feed screw on which said base member is mounted.

87. A system as set forth in claim 86, wherein said arm comprises a nut, mounted on said feed screw, for adjusting said base member.

88. A system as set forth in claim 87, wherein said arm comprises a further elastic member inserted between said base member and said nut.

89. A system as set forth in claim 74, wherein said arm comprises a feed screw having a left-hand screw portion and a right-hand screw portion, on one of which portions said base member is mounted, the other finger being mounted on the other mounting portion.

90. A system as set forth in claim 89, comprising two nuts, mounted on said feed screw, for adjusting said movable member and the other finger.

91. A system as set forth in claim 90, wherein said arm comprises two further elastic members each inserted between a respective one of said base member and the other finger, and the respective one of said nuts.

92. A system as set forth in claim 74, wherein said second driving means comprises a DC motor.

* * * * *

UNITED STATES PATENT AND TRADEMARK OFFICE
CERTIFICATE OF CORRECTION

PATENT NO. : 4,872,803
DATED : October 10, 1989
INVENTOR(S) : Kazuo Asakawa

It is certified that error appears in the above-identified patent and that said Letters Patent is hereby corrected as shown below:

Col. 3, line 25, "1" should be --$\ell$--;
line 26, "Bl" should be --B$\ell$--;
line 31, "Bl" should be --B$\ell$--;
line 39, "Bl" should be --B$\ell$--.

Col. 4,- Equation 1, "Blx" should be --B$\ell$x--;
2, "Bl1" should be --B$\ell$--;
3, "Bl" (all occurrences) should be --B$\ell$ --;
4, "Bl" (all occurrences) should be --B$\ell$ --;
5, "Bl" (all occurrences) should be --B$\ell$ --;

6, change "1" to --$\ell$-- (all occurrences).

Col. 4, line 50, "kR/Bl" should be --kR/B$\ell$--;
line 60, "(KIc/Bl-$P_c$)$O_c$" should be --(KIc/B$\ell$-$P_c$)$O_c$--.

Equation 7, "Bl" should be --B$\ell$-- (both occurrences).

Col. 5, line 38, "$\{X(S)\}$" should be --$\{\dot{X}(S)\}$--;
line 44, "R(S)+$\dot{X}$(S)-X(S)" should be --R(S)+$\dot{X}$(S)-I(S)--.

Col. 8, line 43, "BlI(S)" should be --B$\ell$I(S)--;
line 44, "(Bl, I(S)" should be --B$\ell$, I(S)--.

UNITED STATES PATENT AND TRADEMARK OFFICE
CERTIFICATE OF CORRECTION

PATENT NO. : 4,872,803

DATED : October 10, 1989

INVENTOR(S) : Kazuo Asakawa

It is certified that error appears in the above-identified patent and that said Letters Patent is hereby corrected as shown below:

Column 8:

Equation, line 53, "$F_3(S)=M_c S.\dot{X}'(S)$" should be --$F_3(S)=M_c S \cdot \dot{X}'(S)$--.

Equation 9, "$BlI_c$" should be --$B\ell I_c$--;
        11, "$Bl\dot{x}_c$" should be --$B\ell \dot{x}_c$--;
        12, "$BlI_c$" should be --$B\ell I_c$--;
        14, "$Blx_c$" should be --$B\ell x_c$--.

Column 20, claim 54, line 27, after "respective" insert --aperture--.

Column 21, claim 72, line 56, "tow" should be --two--.

Signed and Sealed this

Twenty-fifth Day of June, 1991

*Attest:*

HARRY F. MANBECK, JR.

*Attesting Officer*      *Commissioner of Patents and Trademarks*